(12) United States Patent
Ueno et al.

(10) Patent No.: US 10,618,572 B2
(45) Date of Patent: Apr. 14, 2020

(54) VEHICLE HAVING A LOAD CARRYING DECK AND ATTACHMENT DEVICE FOR THE SAME

(71) Applicant: Kubota Corporation, Osaka-shi (JP)

(72) Inventors: Satoko Ueno, Sakai (JP); Takashi Kuramoto, Sakai (JP); Junichi Fujiwara, Sakai (JP); Wataru Sasaki, Sakai (JP)

(73) Assignee: Kubota Corporation, Osaka (JP)

( * ) Notice: Subject to any disclaimer, the term of this patent is extended or adjusted under 35 U.S.C. 154(b) by 85 days.

(21) Appl. No.: 15/973,934

(22) Filed: May 8, 2018

(65) Prior Publication Data

US 2018/0334199 A1 Nov. 22, 2018

(30) Foreign Application Priority Data

May 18, 2017 (JP) .................................. 2017-099053
Jun. 1, 2017 (JP) .................................. 2017-109385
Jun. 6, 2017 (JP) .................................. 2017-111965

(51) Int. Cl.
| | | |
|---|---|---|
| *B62D 33/03* | (2006.01) | |
| *B62D 33/08* | (2006.01) | |
| *B62D 21/18* | (2006.01) | |
| *B60P 7/08* | (2006.01) | |
| *B60Q 1/00* | (2006.01) | |
| *B60R 19/02* | (2006.01) | |

(Continued)

(52) U.S. Cl.
CPC ............ *B62D 33/03* (2013.01); *B60P 7/0807* (2013.01); *B60Q 1/0005* (2013.01); *B60Q 1/0035* (2013.01); *B60Q 1/30* (2013.01); *B60R 19/023* (2013.01); *B62D 21/183* (2013.01); *B62D 33/08* (2013.01); *B60P 3/42* (2013.01); *B62D 23/005* (2013.01); *B62D 33/02* (2013.01)

(58) Field of Classification Search
CPC ...... B62D 33/02; B62D 21/183; B62D 33/08; B60P 7/0807; B60Q 1/005; B60Q 1/30; B60R 19/023
See application file for complete search history.

(56) References Cited

U.S. PATENT DOCUMENTS 1,771,319 A * 7/1930 Schmidt .................. B60R 19/50
293/142
2,222,097 A * 11/1940 Williams .............. A63F 7/3065
273/118 A (Continued)

FOREIGN PATENT DOCUMENTS

| JP | 2004161236 A | 6/2004 |
|---|---|---|
| JP | 2011116318 A | 6/2011 |
| JP | 2016179807 A | 10/2016 |

*Primary Examiner* — Lori L Lyjak
(74) *Attorney, Agent, or Firm* — The Webb Law Firm

(57) ABSTRACT

A multi-purpose vehicle includes a seat provided between front wheels and rear wheels, a load carrying deck provided on a rear side of the seat, a right tail lamp provided on a right lower side of a rear portion of the load carrying deck, a left tail lamp provided on a left lower side of the rear portion of the load carrying deck, a right tail lamp guard provided on rear side of the right tail lamp and connected to the load carrying deck, a left tail lamp guard provided on rear side of the left tail lamp and connected to the load carrying deck, and a rear bumper. The rear bumper is connected to and between the right tail lamp guard and the left tail lamp guard.

12 Claims, 15 Drawing Sheets

(51) Int. Cl.
  *B60Q 1/30*  (2006.01)
  *B60P 3/42*  (2006.01)
  *B62D 23/00*  (2006.01)
  *B62D 33/02*  (2006.01)

(56) References Cited

U.S. PATENT DOCUMENTS

| | | | | |
|---|---|---|---|---|
| 5,872,656 A * | 2/1999 | Horwill | ............... | B60Q 1/00 359/601 |
| 5,876,003 A * | 3/1999 | Waagenaar | ............ | B60R 19/00 248/200 |
| D432,064 S * | 10/2000 | Hartog | ..................... | B60P 3/40 D12/190 |
| 6,283,525 B1 * | 9/2001 | Morse | ............... | B62D 33/0273 280/748 |
| 6,425,618 B1 * | 7/2002 | Garland | ................... | B60P 3/40 224/405 |
| 7,007,995 B1 * | 3/2006 | Scarberry | ................. | B60P 3/40 296/26.11 |
| 7,159,918 B2 * | 1/2007 | Lussier | .................... | B60P 3/40 296/26.08 |
| 7,467,884 B2 * | 12/2008 | Hall | ..................... | B60Q 1/0425 362/496 |
| D721,201 S * | 1/2015 | Egly | ..................... | B62D 37/02 D26/139 |
| D721,454 S * | 1/2015 | King | ........................ | B60P 1/28 D26/139 |
| 2002/0164225 A1 | 11/2002 | Snyder et al. | | |
| 2005/0117991 A1 | 6/2005 | Anderson et al. | | |
| 2007/0182193 A1 * | 8/2007 | Fournier | ............ | B62D 33/0273 296/57.1 |
| 2008/0219795 A1 | 9/2008 | Anderson et al. | | |
| 2011/0132678 A1 | 6/2011 | Nakamura et al. | | |
| 2016/0280122 A1 | 9/2016 | Asao et al. | | |
| 2016/0332677 A1 * | 11/2016 | Smith | ................ | B62D 33/0273 |
| 2017/0274944 A1 * | 9/2017 | Nakamura | ............. | B62D 37/02 |
| 2017/0320423 A1 * | 11/2017 | Tashiro | ..................... | B60P 1/28 |
| 2018/0201179 A1 * | 7/2018 | Bennett | ............... | B60Q 1/0005 |

* cited by examiner

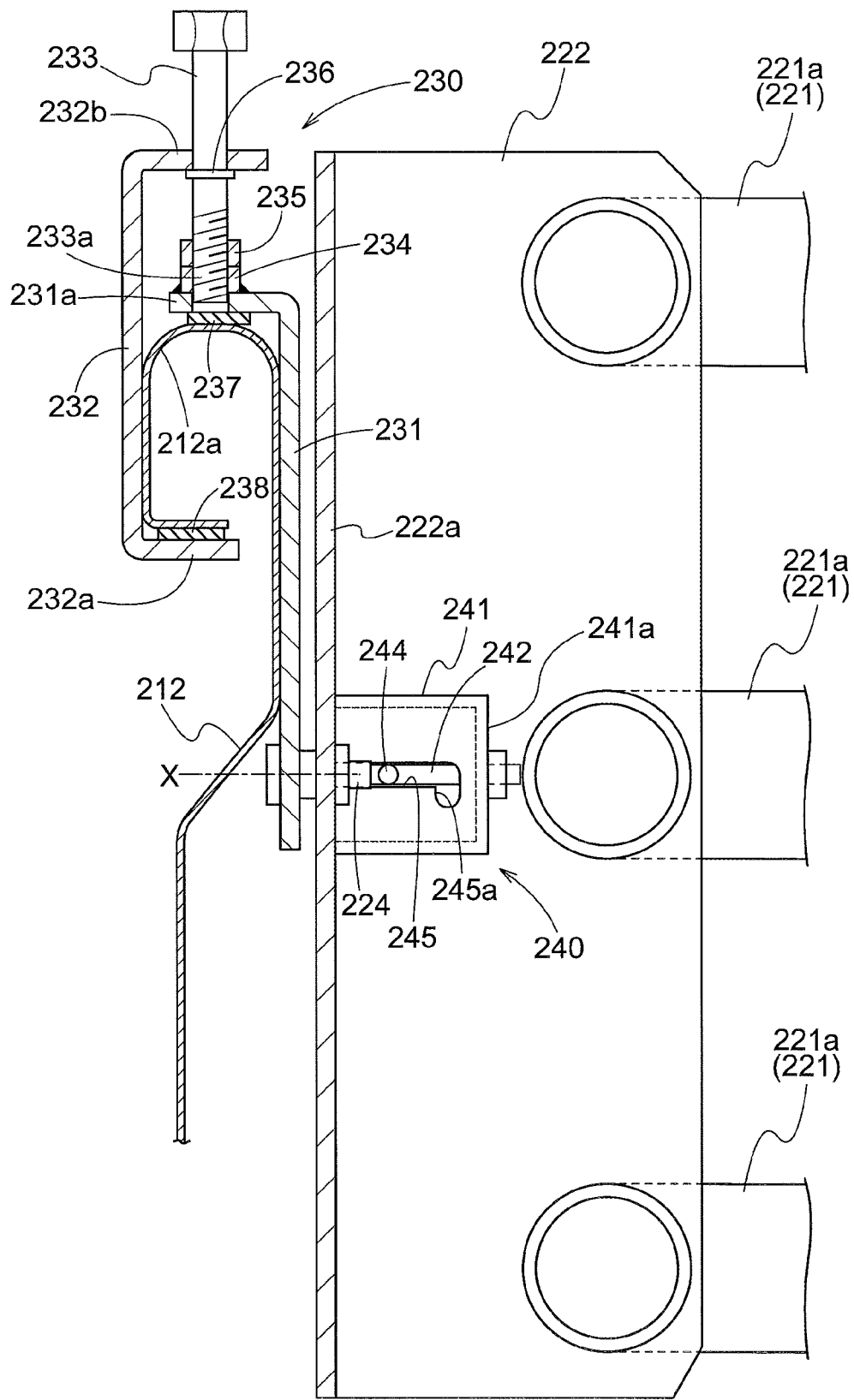

VEHICLE HAVING A LOAD CARRYING DECK AND ATTACHMENT DEVICE FOR THE SAME

CROSS-REFERENCE TO RELATED APPLICATIONS

This application claims priority to Japanese Patent Applications No. 2017-99053, filed May 18, 2017, No. 2017-109385, filed Jun. 1, 2017 and No. 2017-111965, filed Jun. 6, 2017, the disclosures of which are hereby incorporated in their entirety by reference.

BACKGROUND OF THE INVENTION

1. Field of the Invention

The present invention relates to a vehicle having a load carrying deck and relates also to an attachment device for such vehicle having a load carrying deck.

2. Description of Related Art

(1) First Related Art

JP 2011-116318 A (or US 2011/0132678 A1 corresponding thereto) discloses a multi-purpose vehicle for use in transport of persons, transport of load, a recreational activity, etc. In the multi-purpose vehicle, a seat is provided between front wheels and rear wheels and a load carrying deck is mounted on the rear side of the seat; and a headlight and a front bumper are provided at front portions of the vehicle body.

Such multi-purpose vehicle is sometimes equipped with a tail lamp, a tail lamp guard and a rear bumper. Then, there is a need for appropriately supporting such tail lamp guard and the rear bumper.

(2) Second Related Art

As an attachment device for a vehicle having a load carrying deck, there is known a device which includes an attaching portion to be attached to a gate of a deck in such a manner that allows sliding adjustment in a longitudinal direction of the gate of the deck and that allows also fixation at an adjusted position, the attaching portion forming a retaining portion in the gate when the device is attached to the gate. With this attachment for vehicle having a load carrying deck, fixing via the attaching portion at a desired position in the longitudinal direction of the gate of the load carrying deck and the retaining portion can be formed at the fixed portion.

An example of such attachment device is a tie-down attachment component disclosed in JP 2004-161236 A (or US 2002/0164225 A1 corresponding thereto). The tie-down component includes a nut, a washer and a male screw eye; and the component is moved along a track member provided in a lateral wall of the deck with the nut being fitted into this track member. When it reaches an attachment target position, the male screw eye is fastened to the nut, whereby the track member is clamped between the washer and the nut, and the tie-down component is locked to the track member. With this, the eye is fixed to the lateral wall via the track member and the eye forms the retaining portion in the lateral wall.

In the conventional arrangement, as a member for attaching the attachment device to the gate, the track member needs to be provided in the load carrying deck. Further, when it is desired to change the retaining portion formed in the gate to one having a different specification, such as its shape, structure or function, this will require replacement of the entire attachment device, thus increasing the necessary cost. Thus, there is a need for an attachment device for a vehicle having a load carrying deck which can solve the above problems.

(3) Third Related Art

Such vehicles having a load carrying deck include one whose deck has right and left side gates and a tailgate that can be pivoted between an elevated closed posture and a lowered opened posture.

Such vehicles having a load carrying deck include also one having a deck extension member that can be switched over between a deck extending state in which the member projects upwardly of the tailgate assuming the lowered opened posture, thus extending a deck space, and a stored state in which the member is retracted to the inner side of the deck and stored upwardly of a floor portion of the deck. In this configuration, by switching the tailgate to the lowered opened posture and also switching the deck extension member to the deck extension state, the load carrying deck can be extended larger than the normal state in which the tailgate is under the elevated closed posture.

As this type of vehicle having a load carrying deck, conventionally, there is one known from JP 2016-179807 A (or US 2016/0280122 A1 corresponding thereto). The arrangement disclosed in JP2016-179807 A (US 2016/0280122 A1) includes a bed extender as the deck extension member. This bed extender is pivotally supported to right and left side gates and as the extender is pivotally turned by 180 degrees about the pivot, the extender will ride on the lowered opened tailgate to be rendered into a developed state for deck extension or ride on the deck to be rendered into the storage state.

With the conventional arrangement above, the deck extension member is supported at only one portion of the load carrying deck. So, the load extension member retracted to the inner side of the deck to assume the storage posture, will be located only at a particular portion determined by the supported position on the inner side of the deck. Thus, depending on length or size of a load to be mounted on the deck, the deck extension member under the storage posture will become an obstacle. So that, as the end of the load may ride on this load extension member, thus being inclined or one end of the load may hit the load extension member, so that the other end of the load projects from the deck, thus making mounting of the load difficult. Then, there is a need for a vehicle having a load carrying deck whose deck extension member can be readily stored under a condition not presenting obstacle for the mounting of the load.

SUMMARY OF THE INVENTION (1) In correspondence with First Related Art, there is proposed a multi-purpose vehicle as under:

A multi-purpose vehicle comprising:
a vehicle body frame;
front wheels supported at a front portion of the vehicle body frame;
rear wheels supported at a rear portion of the vehicle body;
a seat provided between the front wheels and the rear wheels;

a load carrying deck provided on a rear side of the seat;

a right tail lamp provided on a right lower side of a rear portion of the load carrying deck;

a left tail lamp provided on a left lower side of the rear portion of the load carrying deck;

a right tail lamp guard provided on a rear side of the right tail lamp and connected to the load carrying deck;

a left tail lamp guard provided on the rear side of the left tail lamp and connected to the load carrying deck; and a rear bumper connected to and between the right tail lamp guard and the left tail lamp guard.

With this arrangement, the tail lamp guards can be readily disposed on the rear side of the tail lamps. Further, as the rear bumper is connected to and between the right and left tail lamp guards and this rear bumper is supported to the load carrying deck via the tail lamp guards, the tail lamp guards act also as supporting members for the rear bumper, thus providing advantage in simplicity of the arrangement. Further, as the rear bumper is connected to and between the right and left tail lamp guards, the right and left tail lamp guards are reinforced by the rear dumper.

According to one preferred embodiment, the rear bumper is connected to and between a lower area of the right tail lamp guard and a lower area of the left tail lamp guard. With the arrangement, since the rear dumper does not occupy the vertical center of the tail lamp guards, the rear bumper will not become an obstacle against viewing of the tail lamps from the rear side.

According to one preferred embodiment, a right end portion of the rear bumper projects more on right outer side than a right end portion of the right tail lamp guard; and a left end portion of the rear bumper projects more on left outer side than a left end portion of the left tail lamp guard. With the arrangement, in the rear bumper, in addition to its bumper function for the rear side, its bumper function for the right and left lateral sides can also be enhanced.

Incidentally, in many cases, in a multi-purpose vehicle, its load carrying deck is supported to be freely dumped about a right-left axis at a rear portion. According to one preferred embodiment, the load carrying deck is supported to be pivotable about a right-left axis extending at a rear portion of the load carrying deck; the right tail lamp is attached to a right lower portion of the rear portion of the load carrying deck; and the left tail lamp is attached to a left lower portion of the rear portion of the load carrying deck. With the arrangement, not only the tail lamp guards and the rear bumper, but also the tail lamps are supported to the load carrying deck. So, even when the load carrying deck is operated for dumping, the tail lamps and the tail lamp guards can be maintained in a same positional relationship. Thus, there will not occur a situation in which the tail lamp guards are removed from the tail lamps in association with a dumping operation of the load carrying deck, thus resulting in deterioration in the protective function of the tail lamp guards, so the protective functions of the tail lamp guards can be maintained, irrespectively of a dumping operation of the load carrying deck.

In many cases, in a multi-purpose vehicle, its tailgate at the rear portion of the vehicle body is supported to be openable and closable by right and left pivot members connected to lower portions of the right side and the left side of the rear portion of the load carrying deck.

According to one preferred embodiment, a right pivot member is connected to a lower portion of a rear right portion of the load carrying deck;

a left pivot member is connected to a lower portion of a rear left portion of the load carrying deck;

the load carrying deck includes a tailgate at a rear portion thereof;

the tailgate is supported to be openable/closable by the right pivot member and the left pivot member;

the right tail lamp guard is connected to the right pivot member; and the left tail lamp guard is connected to the left pivot member.

With the arrangement, since the tail lamps are supported to the pivot members, there can be obtained an arrangement that allows smooth opening and closing operations of the tailgate while avoiding interference between the tail lamp guards and the tailgate. Thus, since the pivot members act also as support members for the tail lamp guards, there can be obtained an advantage in the respect of simplification of arrangement.

(2) In correspondence with Second Related Art, there is proposed an attachment device as under:

An attachment device for a vehicle having a load carrying deck, the attachment device being for use in attaching an attaching object to a gate of the load carrying deck, the attachment device comprising:

a mounting portion formed at a portion of the gate, the mounting portion being placed over an upper edge portion of the gate, the mounting portion being slidably adjustable in a longitudinal direction of the gate, with the upper edge portion acting as a guide rail and being fixable by fastening to the upper edge portion at an adjusted position;

an attaching portion formed at a portion of the attaching object; and a retaining device for detachably retaining the attaching object to the attaching portion, the retaining device being replaceable according an attaching object.

With the above-described arrangement, only with replacement of the retaining device, without replacement of the entire attachment device, the specification of the retaining portion on the gate side can be changed. In addition, since the mounting portion is directly mounted to the upper edge portion of the gate and also this upper edge portion of the gate is used as a guide rail, there is no need for any special supporting rail member. Thus, a retaining portion having an appropriate specification can be formed inexpensively at a desired portion of the gate.

According to one preferred embodiment, the mounting portion includes two separate mounting portions divided between inner and outer sides of the load carrying deck; a connecting bolt is provided for interconnecting the two separate mounting portions; and as the two separate mounting portions are fastened to the upper edge portion by the connecting bolt, the mounting portion is fixed and fastened to the gate. With the arrangement, the mounting portion can be fixed to the gate by a fixing arrangement having a relatively simple construction utilizing a connecting bolt as a fastening bolt.

According to one preferred embodiment, the attaching portion comprises a screw hole. With the arrangement, only by providing the retaining device with a simple connecting means having a threaded portion corresponding to a screw hole, the retaining device can be connected to the attaching portion in a firm and reliable manner.

(3) In correspondence with Third Related Art, there is proposed a vehicle having a load carrying deck as under:

A vehicle having a load carrying deck, the load carrying deck having right and left side gates and a tailgate pivotable between an elevated closed posture and a lowered opened posture, the vehicle comprising:

a deck extension member switchable between a deck extending state in which the extension member protrudes above the tailgate to extend a deck space, and a storage state in which the extension member is retracted to the inner side of the load carrying deck and stored above a floor portion of the deck; and a pair of right and left supporting portions that are supported by the right and left side gates to be individually slidably adjustable in the front-rear direction and fixable at adjusted positions;

wherein the deck extension member is supported to be pivotable between the deck extending state and the storage state about a connection axis of the pair of right and left supporting portions as a pivot axis, the connection axis extending in a lateral width direction of the load carrying deck.

With the arrangement, the fixing positions of the supporting portions in the right and left side gates can be changed in the front-rear direction of the side gates. Thus, when the deck extension member is rendered into the storage state and a load is to be mounted, depending on the length, the size of the load, the supporting portion for the load extension member in the deck can be changed in the front-rear direction of the deck in correspondence with the length or size of the load, whereby the deck extension member under its storage posture may be positioned at a portion not to interfere with the mounting operation of the load. Therefore, in the arrangement of the deck extension member being switchable between a deck extending state and a storage state, the deck extension member can be stored in a manner not to interfere with a mounting operation of a load.

According to one preferred embodiment, as the storage state, there are set a first storage state in which the deck extension member is collapsed above the floor portion, and a second storage state in which the deck extension member is raised relative to the floor portion. With the arrangement, when the deck extension member is stored under the second storage state, this load extension member is raised relative to the floor portion, so a greater area of the floor portion can be used than the case of storing it under the first storage state.

According to one preferred embodiment, the deck extension member includes a plurality of bar portions supported by and attached to the pair of right and left supporting portions, the bar portions having right-left intermediate portions thereof extending in the lateral width direction of the deck, gaps being formed between respective adjacent intermediate portions; and when the deck extension member is set to the second storage state, the intermediate portions of the plurality of bar portions are disposed side by side in the front-rear direction of the deck. With the arrangement, when the deck extension member is stored under the second storage state and an elongate object is inserted into the gap to support it to the floor portion, this elongate object will be supported as being placed erect on the floor portion, so the elongate object can be mounted under the state of being placed erect.

According to one preferred embodiment, the side gate includes a guide rail portion that extends in the front-rear direction of the load carrying deck;

the supporting portion includes: a first attaching member to be slidably attached to an upper portion of the guide rail portion; a second attaching member to be slidably attached to a lower portion of the guide rail portion; and a connecting screw for connecting the first attaching member with the second attaching member; and wherein the connecting screw is rotatably supported by the first attaching member and the second attaching member; and wherein the connecting screw is operable between a fastening state in which the first attaching member and the second attaching member are fastened to the guide rail portion for clamping the guide rail portion by the first attaching member and the second attaching member, thereby to fix the supporting portion to the side gate; and a fastening released state in which fastening of the first attaching member and the second attaching member to the guide rail portion is released, thus allowing sliding of the first attaching member and the second attaching member, thereby to allow sliding of the supporting portion relative to the side gate.

With the arrangement, the supporting portion can be fixed to the side gate by a fixing arrangement having a relatively simple construction utilizing a connecting screw as fastening means.

(4) Further and other features and advantages thereof will become apparent upon reading the following description with reference to the accompanying drawings.

BRIEF DESCRIPTION OF THE DRAWINGS

FIG. 24 is a front view in vertical section showing a left supporting portion.

DETAILED DESCRIPTION OF THE PREFERRED EMBODIMENTS

First Embodiment

Front-rear direction and right-left direction in the embodiments of the invention are defined as follows, unless explicitly indicated otherwise. Namely, a traveling direction in forward traveling is the "front", and a traveling direction in reverse traveling is the "rear". Further, relative to a front facing posture in the front-rear direction, the direction corresponding to the right side is "right" and the direction corresponding to the left side is "left", respectively.

[General Arrangement of Multi-Purpose Vehicle]

Figure 1:
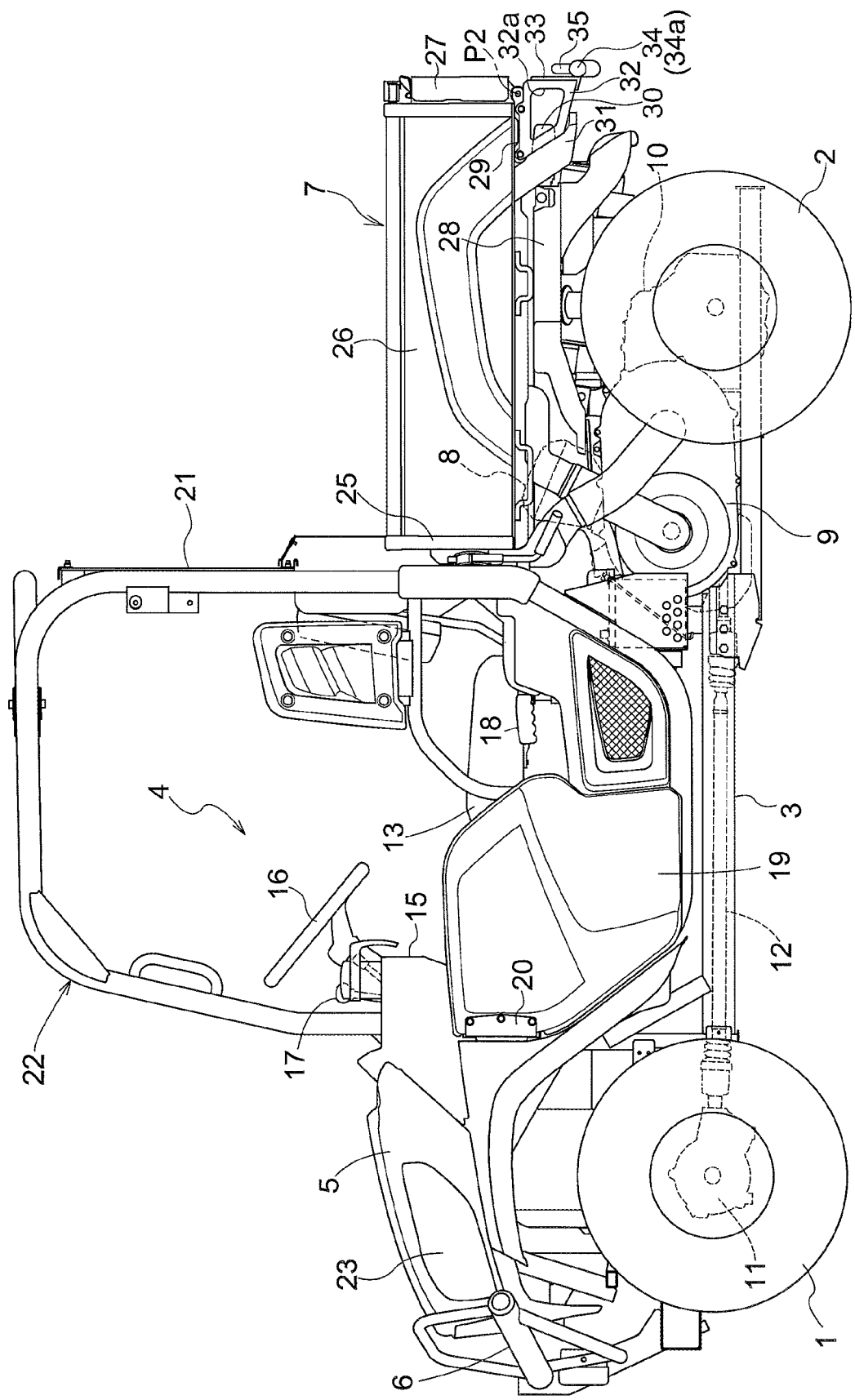
FIG. 1 is a view showing a first embodiment (applied also to drawings up to FIG. 4) and an overall side view of a multi-purpose vehicle.
Figure 2:
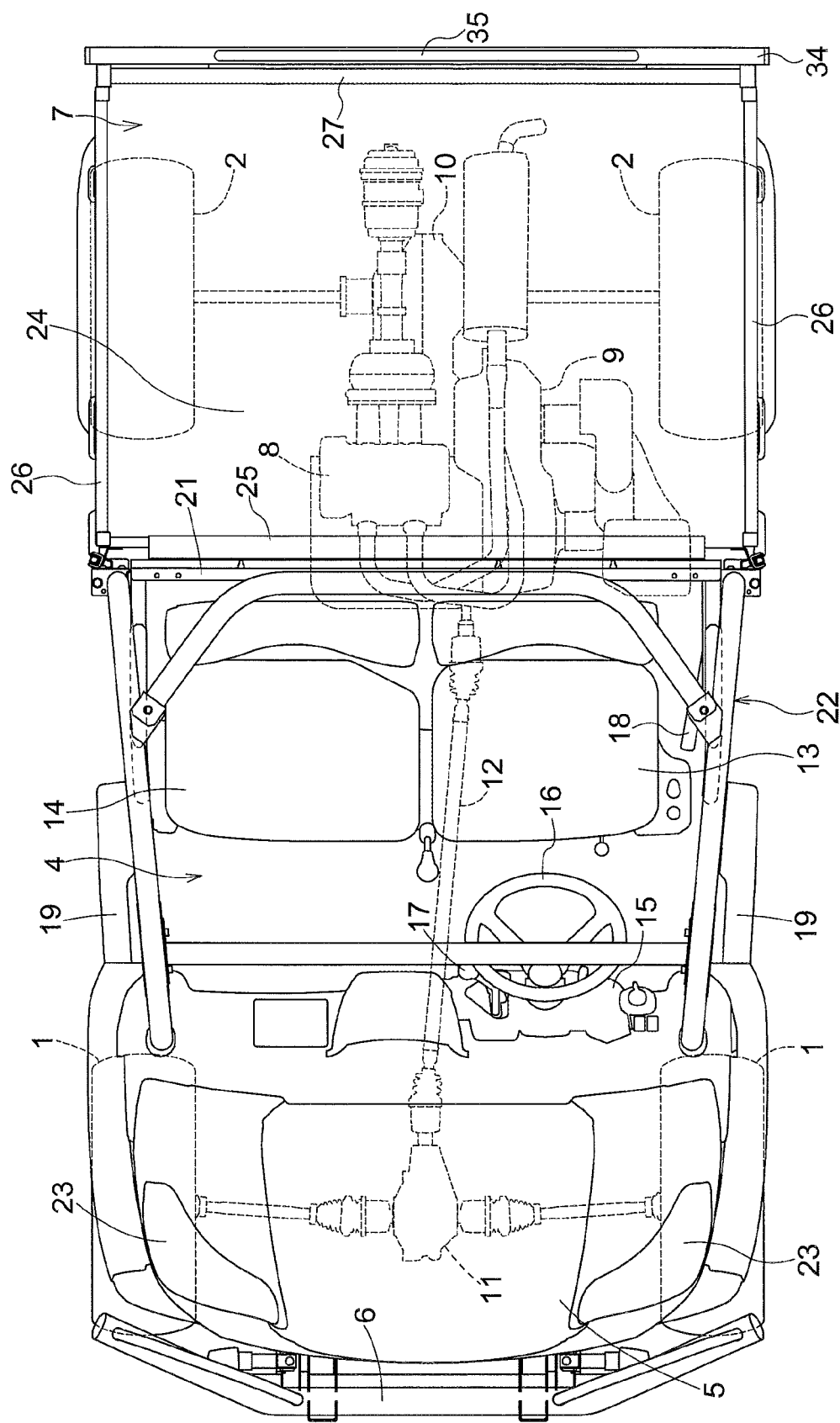
FIG. 2 is an overall plan view of the multi-purpose vehicle.

FIG. 1 and FIG. 2 show a multi-purpose vehicle in its entirety. At front portion of a vehicle body frame 3, right and left front wheels 1 are supported. At a rear portion of the vehicle body frame 3, right and left rear wheels 2 are supported. In the vehicle body frame 3, a driving section 4 is provided between the front wheels 1 and the rear wheels 2. On the front side of the driving section 4, a hood 5 and a front bumper 6 are provided. The hood 5 mounts right and left headlights 23. On the rear side of the driving section 4, a load carrying deck 7 is provided.

As shown in FIG. 1 and FIG. 2, at rear portions of the vehicle body frame 3, there are provided an engine 8, a belt type stepless speed changer device 9 and a transmission case 10. At a front portion of the vehicle body frame 3, a front wheel differential device 11 is provided. A transmission shaft 12 is connected to/between the transmission case 10 and the front wheel differential device 11.

As shown in FIG. 1 and FIG. 2, power of the engine 8 is transmitted to the stepless speed changer device 9; and power from this stepless speed changer device 9 is transmitted to a gear speed changer device (not shown) in the transmission case 10 and a rear wheel differential device (not shown) and then transmitted to the right and left rear wheels 2. Power taken off immediately before the rear wheel differential device is transmitted via the transmission shaft 12 to the front wheel differential device 11 and then to the right and left front wheels 1.

[Arrangement of Driving Section]

As shown in FIG. 1 and FIG. 2, in the driving section 4, there are provided a driver's seat 13 (corresponding to "seat") on the left side and an auxiliary seat 14 (corresponding to "seat") on the right side. In a driving panel 15 disposed on the front side of the driver's seat 13, there are provided a steering wheel 16 for steering the front wheels 1, and a speed changer lever 17 for operating the gear speed changer device of the transmission case 10.

On the lower side of the front side of the driver's seat 13, a speed changer pedal (not shown) is provided. The speed changer pedal, the engine 8 and the stepless speed changer device 9 are mechanically connected to each other, so that in response to a stepping-on operation on the speed changer pedal, an accelerator portion of the engine 8 is operated to a higher speed side and the stepless speed changer device 9 is operated to a higher speed side.

As shown in FIG. 1 and FIG. 2, on the left lateral outer side of the driver's seat 13, there is provided a parking brake lever 18 for operating a parking brake (not shown). At right and left portions of the lower portion of the driving section 4, there are provided doors 19. Via a hinge 20 connected to a front portion of the door 19, the door 19 can be opened or closed as being pivoted about the front portion of the door 19 as the pivot point.

As shown in FIG. 1 and FIG. 2, a ROPS (rollover protection structure) frame 22 is connected to the vehicle body frame 2 and is provided in the driving section 4 in such a manner as to surround the driver's seat 13 and the auxiliary seat 14. On the rear side of the driver's seat 13 and the auxiliary seat 14, there is provided a partitioning plate 21 for partitioning between the driver's seat 13, the auxiliary seat 14 and the load carrying deck 7.

[Arrangement of Load Carrying Deck]

As shown in FIGS. 1, 2, 3 and 4, the load carrying deck 7 includes a bottom plate portion 24, a front wall portion 25, right and left side wall portions 26 and a tailgate 27 acting as a rear wall portion.

Figure 3:
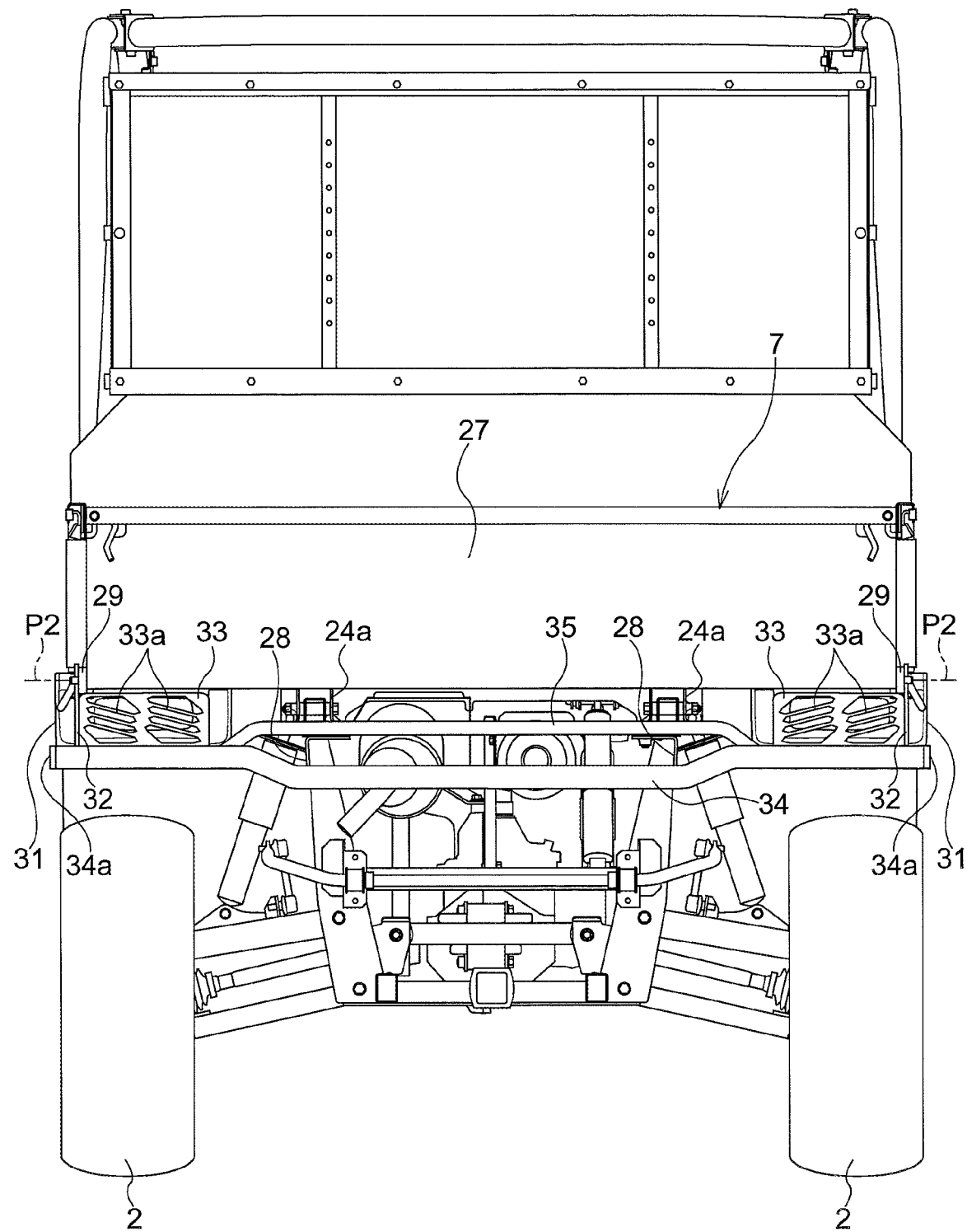
FIG. 3 is a rear view of the multi-purpose vehicle.
Figure 4:
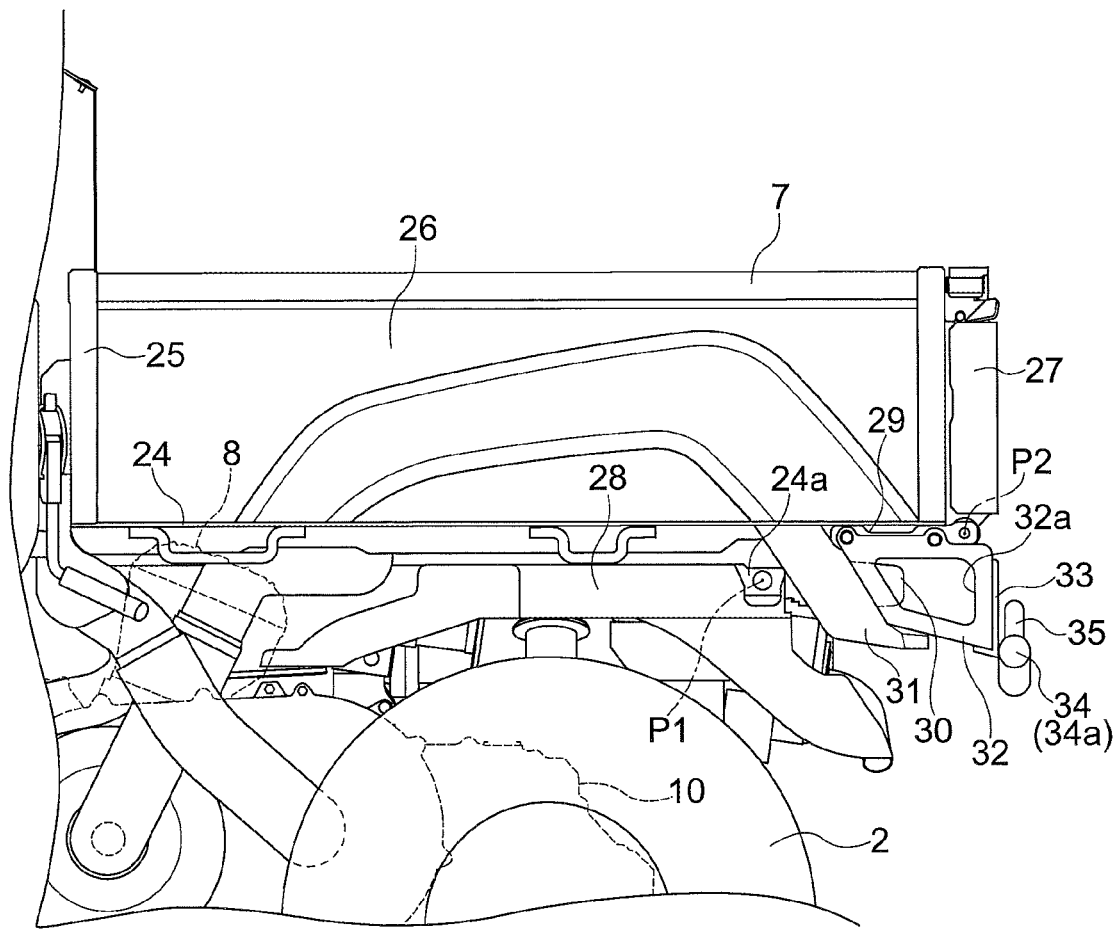
FIG. 4 is a side view showing vicinities of a load carrying deck, a tail lamp, a tail lamp guard and a rear bumper.

As shown in FIGS. 1, 3 and 4, upwardly of the engine 8, the stepless speed changer device 9 and the transmission case 10, there are disposed right and left support frames 28 in the front-rear direction. A bracket 24a connected to a rear portion of the bottom plate portion 24 is supported to be pivotable about a right-left axis P1 of the support frame 28. With this, the load carrying deck 7 is supported for enabling a dumping operation at a position elevated to the upper side from the position shown in FIG. 1 and FIG. 4 about the right-left axis P1 at the rear portion of the load carrying deck 3.

As shown in FIGS. 1, 3 and 4, to lower portions of right and left portions of the rear portion of the load carrying deck 7 (bottom plate portion 24 and side wall portion 26), right and left pivot members 29 are connected under front-rear orientation and lower portions of the tailgate 27 are supported to be pivotable about right-left axes P2 at rear portions of the pivot members 29.

With the above, the tailgate 27 is supported to be opened and closed about the axes P2 between a closed position shown in FIGS. 3 and 4 and an opened position collapsed to the rear side from the closed position.

[Arrangements of Tail Lamps and Tail Lamp Guards]

As shown in FIG. 4, at lower portions of the right and left portions of the rear portions of the load carrying deck 7 (bottom plate portion 24), right and left tail lamps 30 are mounted. Each tail lamp 30 includes a back lamp (not shown) which is illuminated at the time of reverse traveling, a direction indicator lamp (not shown), etc.

As shown in FIG. 3 and FIG. 4, right and left tail lamp guards 31 having a channel shape in the rear view are connected to the bottom plate portion 24 in such as manner as to surround the tail lamps 30. The tail lamp guards 31 protect right and left lateral outer sides and lower sides of the tail lamps 30.

As shown in FIGS. 3 and 4, right and left supporting members 32 are connected to the pivot members 29 and extend downwards. The supporting members 32 are disposed on the right and left lateral outer sides of the tail lamps 30 and the supporting members 32 define large openings 32a, so that the tail lamps 30 can be viewed through these openings 32a of the supporting members 32 from the right and left lateral outer sides.

As shown in FIGS. 3 and 4, right and left tail lamp guards 33 are connected under a vertical orientation to rear portions of the supporting members 32 and extend cantilever-wise to the right-left center side of the load carrying deck 7, and the tail lamp guards 33 are disposed on the rear side of the tail lamps 30. The tail lamp guards 33 define many openings 33a, so that from the rear side through these openings 33a of the tail lamp guards 33, the tail lamps 30 can be viewed.

As shown in FIG. 3 and FIG. 4, the right and left tail lamp guards 33 are connected via the supporting members 32 to the pivot members 29, and connected via the pivot members 29 to the lower portions of the right and left portions of the rear portions of the load carrying deck 7. As each tail lamp guard 33 extends cantilever-wise from the supporting member 32 to the right-left center side of the deck 7, not connected to the tailgate 27, whereby opening and closing operations of the tailgate 27 can be effected smoothly without interfering with the tail lamp guards 33.

As shown in FIG. 3 and FIG. 4, as the tail lamps 30 and the tail lamp guards 31, 33 are supported to the load carrying deck 7, even when this load carrying deck 7 is operated for dumping, the tail lamps 30 and the tail lamp guards 31, 33 will maintain a same positional relationship.

[Arrangement of Rear Bumper]

As shown in FIG. 3 and FIG. 4, a rear bumper 34 is connected to/between lower portions of the right and left tail lamp guards 33.

As shown in FIG. 3 and FIG. 4, right and left end portions 34a of the rear bumper 34 project more on lateral outer sides than the right and left end portion of the right and left tail lamp guards 33 (supporting members 32). A rear bumper 35 is connected upwards to an intermediate portion of the rear bumper 34; and the rear bumper 35 is interposed between the right and left tail lamp guards 33 as seen in a rear view.

As shown in FIG. 3 and FIG. 4, with the arrangement of the rear bumper 34 being connected to lower portions of the right and left tail lamp guards 33 and the arrangement of the rear bumper 35 being disposed between the right and left rear tail lamp guards 33 as seen in the rear view, the rear bumpers 34, 35 do not block the vertical center of the tail lamp guards 33, thus the rear bumpers 34, 35 present no visual obstacles against viewing of the tail lamps 30 from the rear side.

[Modified Embodiments of First Embodiment]

(1) The tail lamp 30 can be attached not to the load carrying deck 7, but to certain vehicle body portions such as the supporting frames 28, thus being disposed on the lower side of the right and left portions of the rear portion of the load carrying deck 7.

(2) The rear bumper 34 can be connected not to/between the lower portion of the right and left tail lamp guards 33, but to/between portions slightly upwards from the lower portions of the right and left tail lamp guards 33.

(3) The tail lamp guards 33 can be connected not to the pivot members 29, but to the bottom plate portion 24 of the load carrying deck 7.

(4) A seat or seats (not shown) can be provided on the rear side of the driver's seat 13 and the auxiliary seat 14.

Second Embodiment

Next, a second embodiment will be explained.

Figure 5:
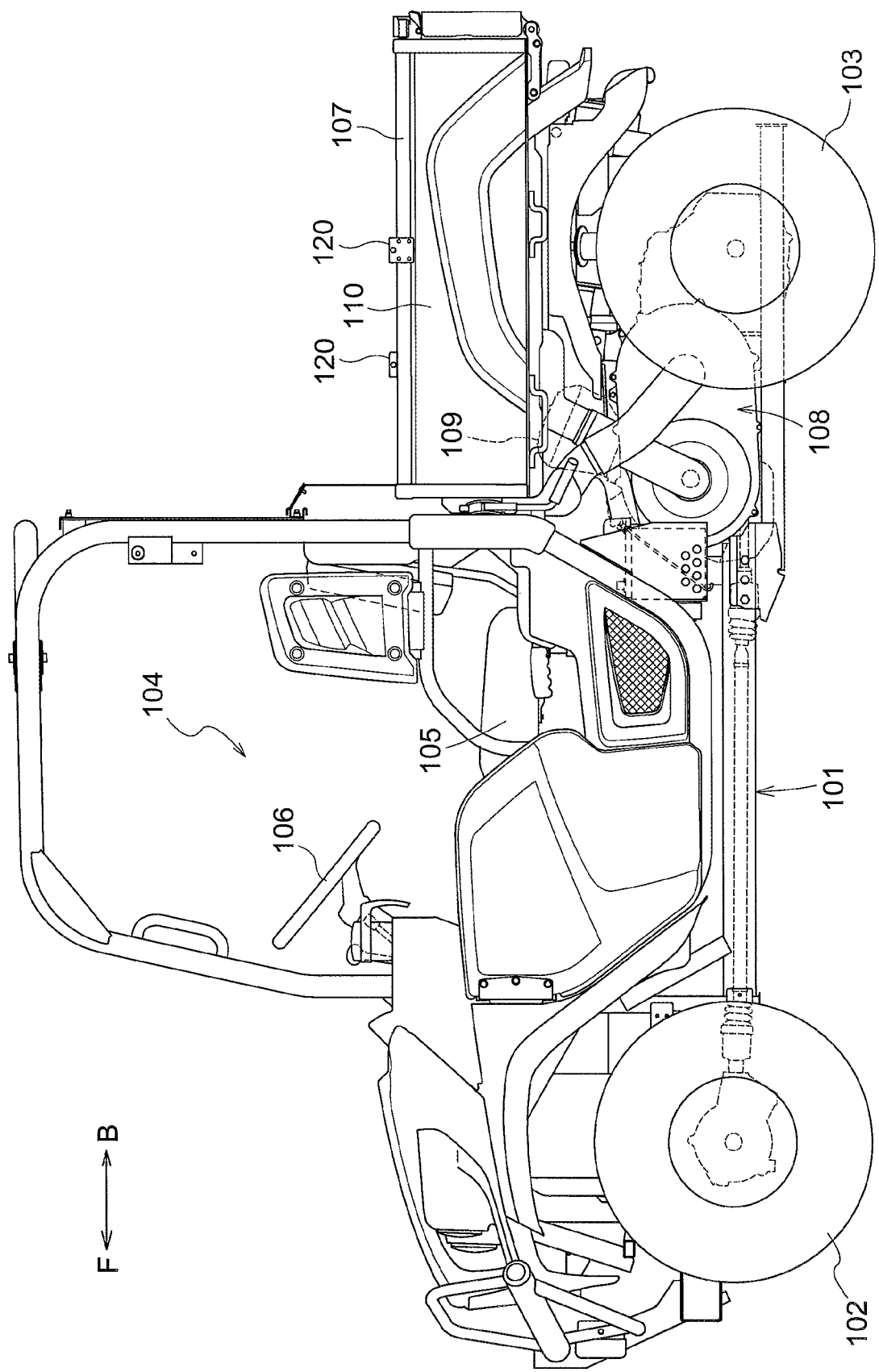
FIG. 5 is a view showing a second embodiment (applied also to drawings up to FIG. 14) and a left side view of entirety of a utility vehicle.

FIG. 5 is a side view showing an entire utility vehicle (a multi-purpose vehicle) as one example of a vehicle having a load carrying deck. A direction of "F" shown in FIG. 5 is defined as the front direction of a traveling vehicle body 101, a direction of "B" is defined as the rear direction of the traveling vehicle body 101, a direction on the near side in the view is defined as the left direction of the traveling vehicle body 101 and a direction on the far side in the view is defined as the right direction of the traveling vehicle body 101, respectively.

[Configuration of Utility Vehicle]

Figure 6:
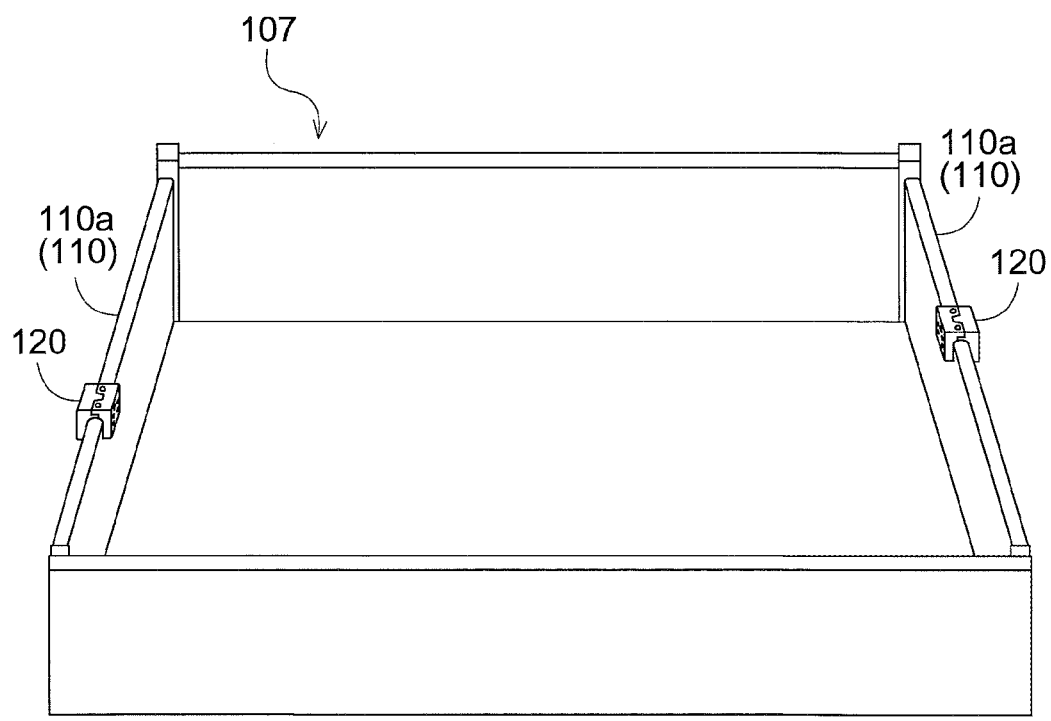
FIG. 6 is a perspective view showing a load carrying deck under a state with attachment of an attachment for a vehicle having a load carrying deck.

As shown in FIG. 5, the utility vehicle includes the traveling vehicle body 101 mounting a pair of right and left front wheels 102 which are drivable and steerable and a pair of right and left rear wheels 103 which are drivable. At a front portion of the traveling vehicle body 101, a driving section 104 is formed. In this driving section 104, there are provided a driver's seat 105 and a steering wheel 106 for steering the front wheels 102. At a rear portion of the traveling vehicle body 101, a load carrying deck 107 is provided. Under the load carrying deck 107, an engine section 108 is formed. The engine section 108 includes an engine 109 for transmitting power to the front wheels 102 and the rear wheels 103, and so on. As shown in FIG. 5 and FIG. 6, to left side and right side gates 110 of the deck 107, there are mounted attachment devices for a vehicle having a load carrying deck (to be referred to shortly as "attachments 120" hereinafter).

[Arrangement of Attachment 120]

The attachments 120 mounted to the left side and right side gates 110 have an identical arrangement. Each attachment 120 is provided for forming, at a desired position in the longitudinal direction of the gate 110, retaining portions 113, 114 (see FIG. 11 and FIG. 12) for mounting attachments 111, 112 (see FIG. 11, FIG. 12) other than this attachment 120, retaining portions 115, 116 (see FIG. 13, FIG. 14) for hooking lashing tools such as a rope, a chain, etc. for fixing load to the deck 107 (each of which is an example of "an attaching object"). Each attachment 120 is configured as follows.

As shown in FIGS. 7 through 10, the attachment 120 includes two separate attachments 122 which are divided in the inner-outer direction of the load carrying deck 107 by diving the attachment 120 with a single dividing face 121, a single connecting bolt 123 and a single nut 124. In the instant embodiment, the separate attachments 122 are formed of an aluminum alloy material. However, the material is not limited thereto, but various kinds of materials such as resin material, iron material, etc. can also be used.

On the lateral sides of the inner sides of the two separate attachments 122, separate mounting portions 125a are formed. At portions of the two separate attachments 122 and on the upper sides of the separate mounting portions 125a, there are provided connecting holes 126 that extend through the separate attachments 122 in the lateral width direction. And, screw holes 127 are formed at four portions at lateral outer side portions 122a of the two separate attachments 122. A retaining portion 128 is formed on the lower side of the separate mounting portion 125a of one separate attachment 122. And, screw holes 127 are formed at two portions of an upper face portion 122b of one separate attachment 122. In this embodiment, each screw hole 127 constitutes an attaching portion of the attachment 120. In this embodiment, 10 (ten) screw holes 127 are formed. Instead, it is also possible to employ less than 9 (nine) or more than 11 (eleven) screw holes.

Figure 7:
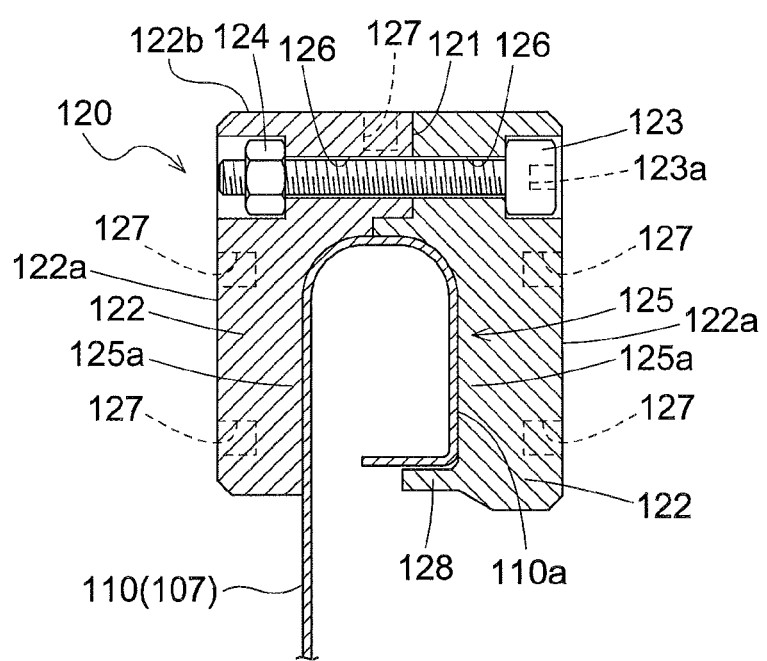
FIG. 7 is a front view in vertical section showing the attachment for a vehicle having a load carrying deck.
Figure 8:
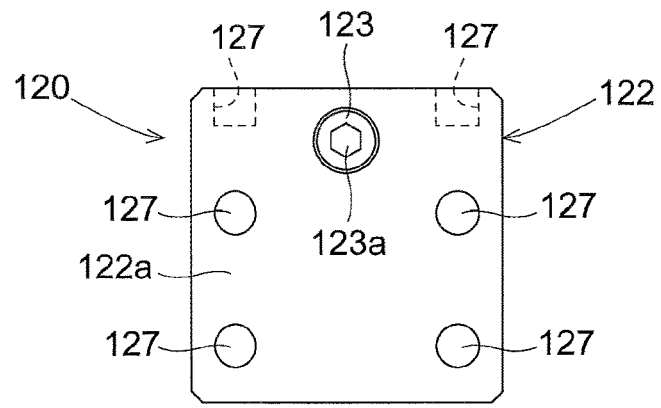
FIG. 8 is a right side view showing the attachment for a vehicle having a load carrying deck.
Figure 9:
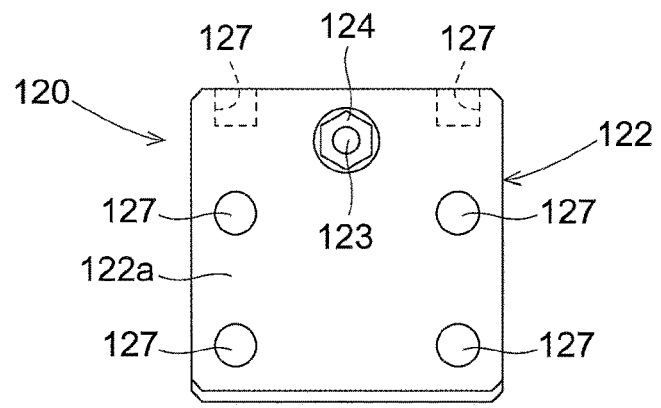
FIG. 9 is a left side view showing the attachment for a vehicle having a load carrying deck.
Figure 10:
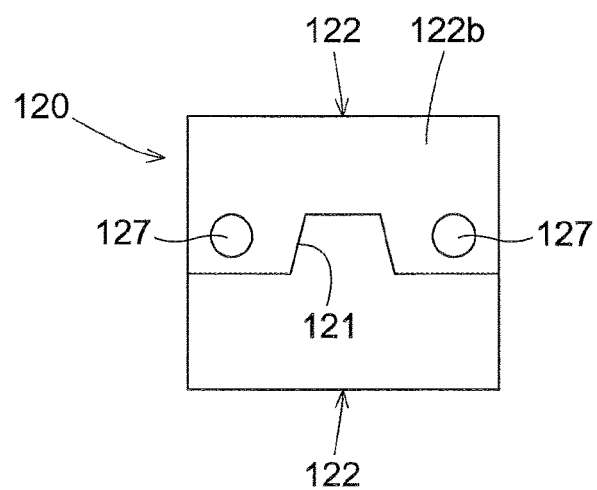
FIG. 10 is a plan view showing the attachment for a vehicle having a load carrying deck.

As shown in FIG. 7, the two separate attachments 122 will be placed in abutment against an upper edge portion 110a of the gate 110, with the upper edge portion 110a of the gate 110 being clamped by the separate mounting portions 125a of the two separate attachments 122 from the inner-outer direction of the load carrying deck. Then, into the connecting holes 126 of the two separate attachments 122 under this state, the connecting bolt 123 will be fitted, thus interconnecting the two separate attachments 122 via the connecting bolt 123. With this, the separate mounting portions 125*a* of the two separate attachments 122 are interconnected via the connecting bolt 123, and the two separate mounting portions 125*a* constitute a mounting portion 125 as the attachment as a whole and also this mounting portion 125 covers the upper edge portion 110*a*, so that the attachment 120 can be fitted to the upper edge portion 110*a*. Under this mounted state, the retaining portion 128 engages the lower end of the upper edge portion 110*a*, so that upward detachment of the attachment 120 from the gate 110 is prevented by the retaining portion 128. In the instant embodiment, the connecting bolt 123 includes a hexagonal hole 123*a* at its head, to be operable by a hexagonal wrench. However, the arrangement is not limited to such bolt having a hexagonal hole. Instead, a hexagonal bolt or a butterfly bolt can also be employed.

By keeping the connecting bolt 123 not strongly fastened, the mounting portion 125 can remain slidably adjustable in the longitudinal direction of the gate 110 with using the upper edge portion 110*a* as a guide rail, so that the attachment 120 can be slidably adjusted in the longitudinal direction of the gate 110. After the attachment 120 is slidably adjusted and the attachment 120 is located at a retaining portion forming target portion of the gate 110, the connecting bolt 123 will be fastened strongly. With this, the clamping of the upper edge portion 110*a* by the two separate mounting portions 125*a* is made stronger, so that the mounting portion 125 can now be fixed to the upper edge portion 110*a* and the attachment 120 will be fixed at the retaining portion forming target portion of the gate 110.

[Examples of Forming Retaining Portion]

Figure 11:
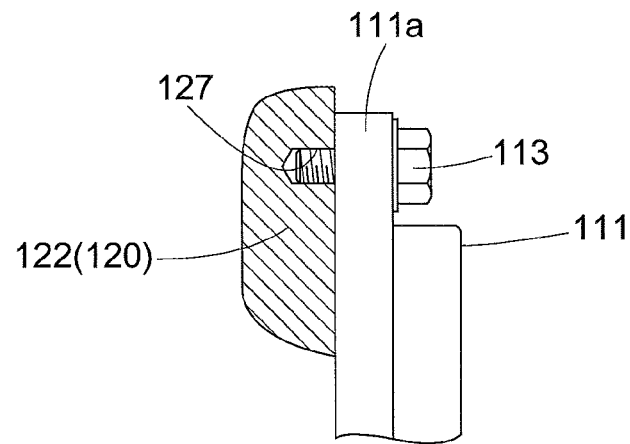
FIG. 11 is a section view showing a forming state of a retaining portion for attaching a further attachment.

(1) As shown in FIG. 11, in case a further attachment 111 (replaceable second attachment) is to be mounted to the gate 110, a connecting bolt will be fitted to a connecting portion 111*a* of this further attachment 111 and the screw hole 127 of the attachment 120. In this example, the connecting bolt constitutes a detachable and replaceable retaining device. And, when the attachment 120 is fixed to an adjusted position of the gate 110, the connecting bolt becomes a retaining portion forming member. And, the retaining portion 113 thus formed will be supported to the attachment 120 and the retaining portion 113 will be formed at a retaining portion forming target portion of the gate 110, so that the further attachment 111 can be mounted to the gate 110.

Figure 12:
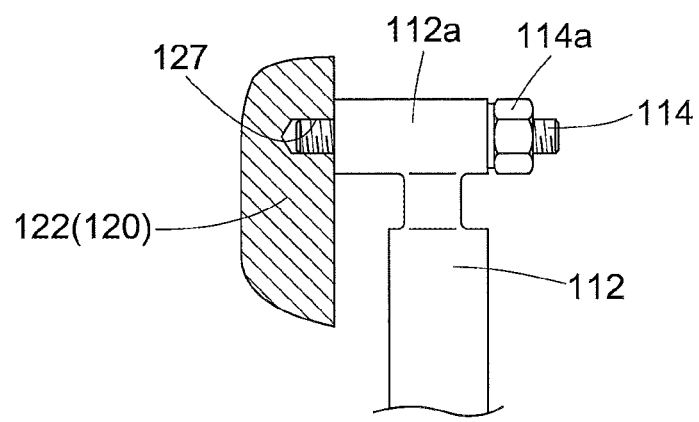
FIG. 12 is a section view showing a forming state of the retaining portion for attaching a further attachment.

(2) As shown in FIG. 12, in case a still further attachment 112 (replaceable second attachment) is to be mounted to the gate 110, a screw shaft and nut 114*a* will be fitted to/between a connecting portion 112*a* of this further attachment 112 and the screw hole 127 of the attachment 120. In this example, the screw shaft constitutes a detachable and replaceable retaining device. When the attachment 120 is fixed to an adjusted position of the gate 110, the screw shaft becomes a retaining portion forming member. And, a retaining portion 114 thus formed will be supported to the attachment 120 and the retaining portion 114 will be formed at a retaining portion forming target portion of the gate 110, so that the further attachment 112 can be mounted to the gate 110.

Figure 13:
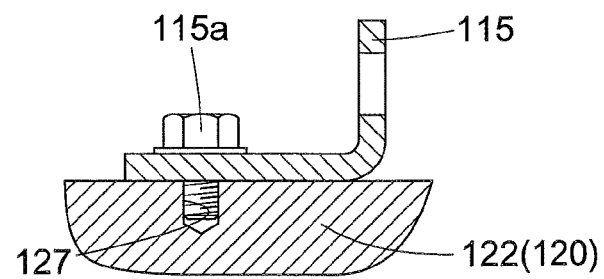
FIG. 13 is a section view showing a forming state of a retaining portion for attaching a lashing tool.

(3) As shown in FIG. 13, in case a bracket having a hole for hooking a lashing tool such as a rope, a chain, is to be mounted to the gate 110, a connecting bolt 115*a* will be fitted to/between a connecting portion of the bracket and the screw hole 127 of the attachment 120. In this example, the connecting bolt 115*a* constitutes a detachable and replaceable retaining device. When the attachment 120 is fixed to an adjusted position of the gate 110, the connecting bolt 115*a* becomes a retaining portion forming member. And, a retaining portion 115 thus formed will be supported to the attachment 120 and the retaining portion 115 will be formed at a retaining portion forming target portion of the gate 110.

Figure 14:
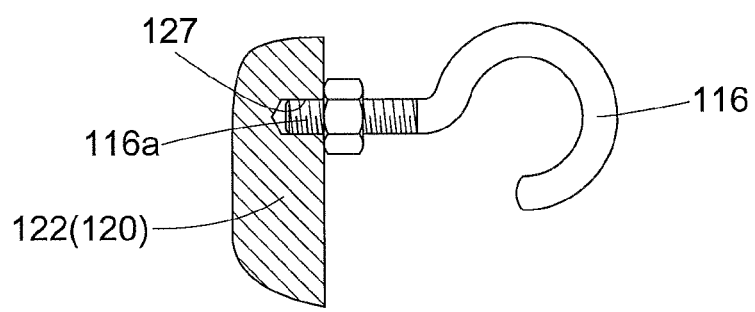
FIG. 14 is a section view showing a forming state of a retaining portion for attaching a lashing tool.

(4) As shown in FIG. 14, in case a hook for hooking a lashing tool such as a rope, a chain, is to be mounted to the gate 110, a threaded portion 116*a* (connecting portion) of the hook will be fitted in the screw hole 127 of the attachment 120. In this example, the hook constitutes a detachable and replaceable retaining device. And, when the attachment 120 is fixed to an adjusted position of the gate 110, the hook becomes a retaining portion forming member. And, a retaining portion 116 thus formed will be supported to the attachment 120 and the retaining portion 116 will be formed at a retaining portion forming target portion of the gate 110.

[Modified Embodiments of Second Embodiment]

(1) In the foregoing embodiment, there was disclosed the arrangement in which the screw hole 127 is provided in the opposed lateral portions 122*a* and the upper face portion 122*b* of the attachment 120. Alternatively, it is also possible to embody such that the screw hole 127 is provided only in one of the opposed lateral portions 122*a*, or provided at two positions, one in one of the opposed lateral portions 122*a* and the other in the upper face portion 122*b*, or provided only in the upper face portion 122*b*.

(2) In the foregoing embodiment, there was disclosed the arrangement in which the two separate attachments 122 are interconnected via the connecting bolt 123 and the two separate mounting portions 125*a* are fastened to the upper edge portion 110*a* via the connecting bolt 123. In place of this arrangement, it is also possible to employ an arrangement in which the two separate attachments 122 are interconnected to be openable and closable by a C-shaped plate spring which clamps the two separate attachments 122 from the opposed lateral sides thereof and also with this plate spring, the two separate attachments 122 are urged to be closed to be fastened to the upper edge portion 110*a*. Further alternatively, a member for interconnecting the two separate attachments 122 and a fastening member for fastening the two separate attachments 12 to the upper edge portion 110*a* can be provided separately.

(3) In the foregoing embodiment, there was disclosed the arrangement in which the attachment 120 is mounted to the side gates 110. Alternatively, it is also possible to arrange such that the attachment 120 can be mounted to any one of the side gates 100, the tailgate or front gate.

(4) In the foregoing embodiment, there was disclosed the arrangement in which a utility vehicle was employed as a vehicle having a load carrying deck. However, the vehicle having a load carrying deck is not limited thereto, but may be various kinds of vehicles having a load carrying deck, such as a pickup truck, a transport vehicle, etc.

Third Embodiment

Next, a third embodiment will be explained. In this embodiment too, a utility vehicle (a multi-purpose vehicle) is used as an example of a vehicle having a load carrying deck.

Figure 15:
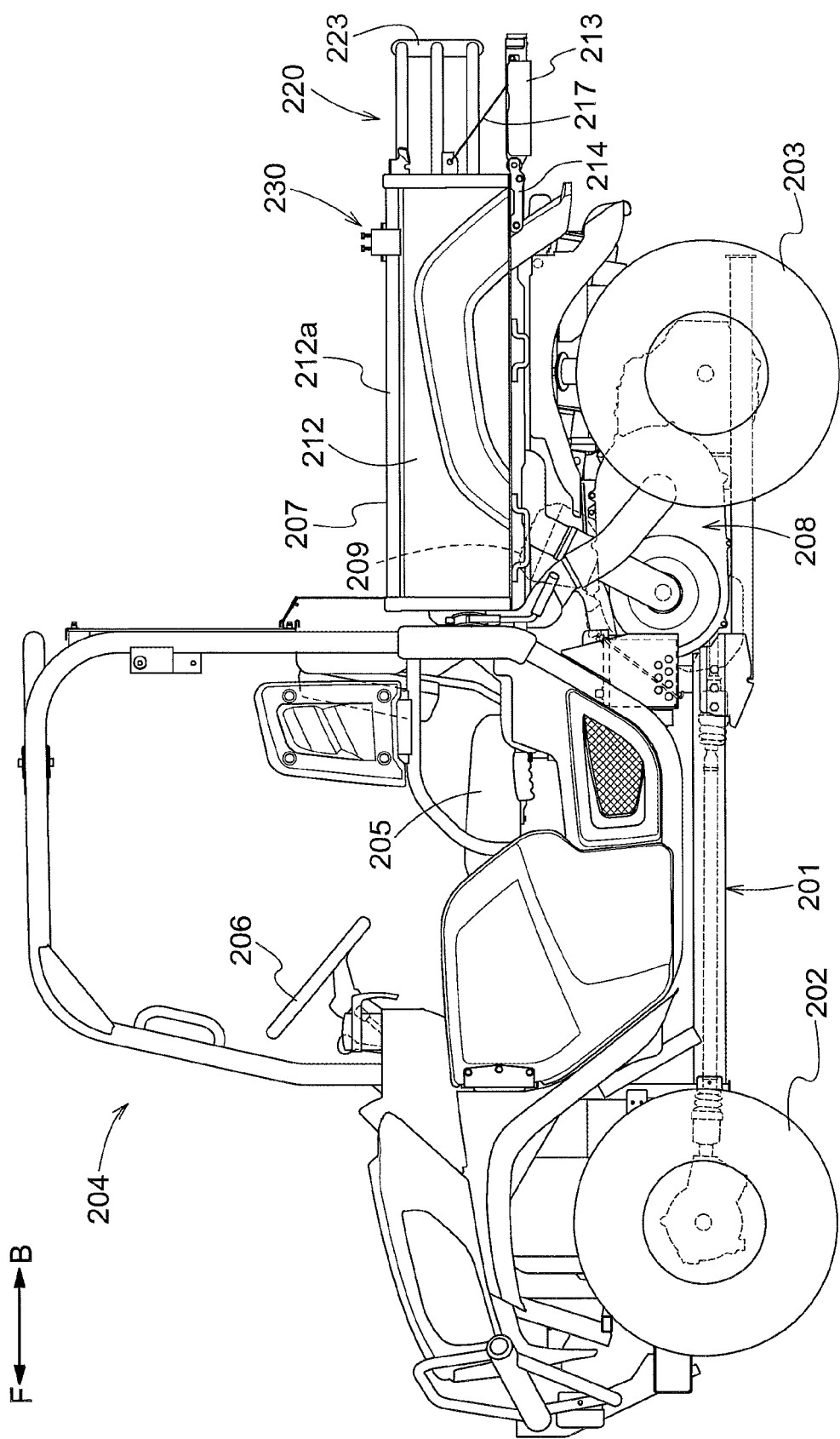
FIG. 15 is a view showing a third embodiment (applied also to drawings up to FIG. 24) and a left side view showing entirety of a utility vehicle with its load carrying deck being extended.

FIG. 15 is a side view showing an entire utility vehicle (a multi-purpose vehicle) as one example of a vehicle having a load carrying deck. A direction of "F" shown in FIG. 15 is defined as the front direction of a traveling vehicle body 201, a direction of "B" is defined as the rear direction of the traveling vehicle body 201, a direction on the near side in the view is defined as the left direction of the traveling vehicle body 201 and a direction on the far side in the view is defined as the right direction of the traveling vehicle body 201, respectively.

[General Configuration of Utility Vehicle]

The utility vehicle includes the traveling vehicle body 201 mounting a pair of right and left front wheels 202 which are drivable and steerable, and a pair of right and left rear wheels 203 which are drivable. At a front portion of the traveling vehicle body 201, a driving section 204 is formed. In this driving section 204, there are provided a driver's seat 205 and a steering wheel 206 for steering the front wheels 202. At a rear portion of the traveling vehicle body 201, a load carrying deck 207 is provided. Under the load carrying deck 207, an engine section 208 is formed. This engine section 208 includes an engine 209 for transmitting power to the front wheels 202 and the rear wheels 203, and so on.

[Arrangement of Load Carrying Deck 207]

Figure 16:
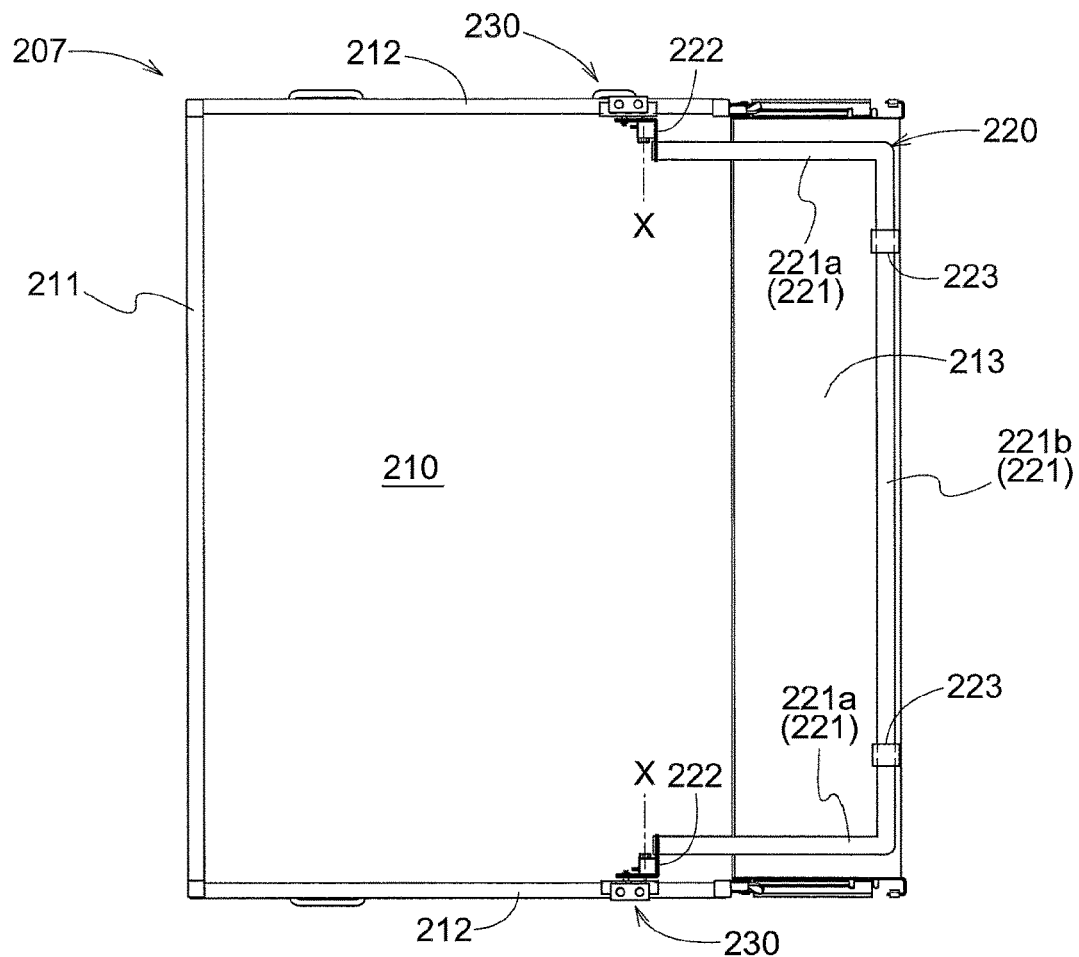
FIG. 16 is a plan view showing the load carrying deck under its extended state.

As shown in FIG. 15 and FIG. 16, the load carrying deck 207 includes a floor portion 210, a front gate 211, right and left side gates 212, a tailgate 213 and a deck extension member 220.

Figure 17:
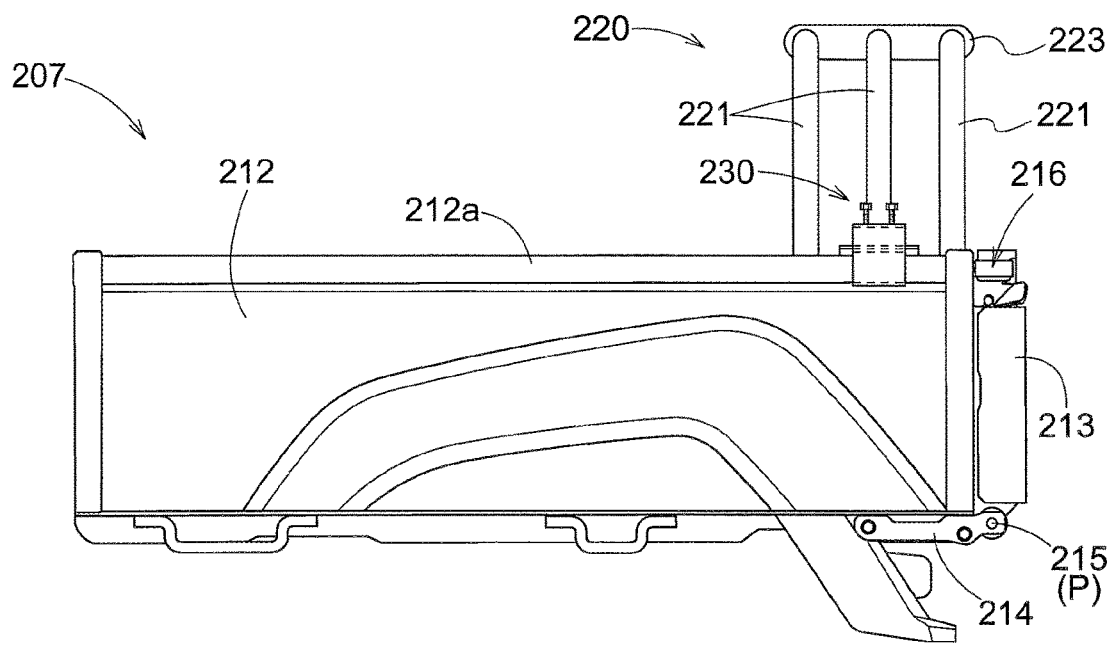
FIG. 17 is a left side view showing the load carrying deck with a deck extension member being switched to a second storage state.

As shown in FIG. 15 and FIG. 17, downwardly of rear end of the load carrying deck 207, there are formed gate supporting portions 214. The tailgate 213 is supported to the gate supporting portions 124 via support shafts 215, and is supported to be pivotable between an elevated closed posture and a lowered opened posture about axes P extending in the deck lateral width direction of the support shafts 125.

As shown in FIG. 17, a lock mechanism 216 is provided between the tailgate 213 and the side gate 212. When the tailgate 213 is switched to the elevated closed posture, by switching the lock mechanism 216 to an active state, the tailgate 213 is maintained under the elevated closed posture by the lock mechanism 216. To/between the tailgate 213 and the side gate 212, a suspension wire 217 (see FIG. 15) is connected. When the tailgate 213 is switched to the lowered opened posture, the suspension wire 217 is tensed, so that the tailgate 213 is supported in suspension under the lowered opened posture by the suspension wire 217.

[Arrangement of Deck Extension Member 220]

Figure 18:
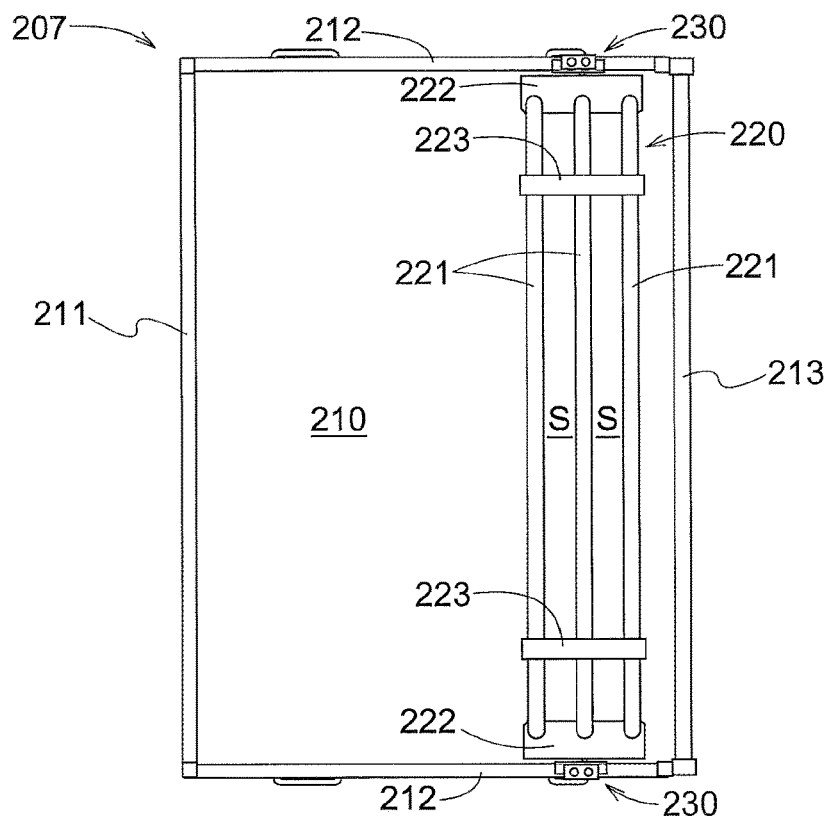
FIG. 18 is a plan view showing the deck with the deck extension member being stored to the second storage state.

As shown in FIG. 16, FIG. 17 and FIG. 18, the deck extension member 220 includes three bar portions 221 and bar supporting portions 222 to which opposed ends in the deck lateral width direction of the bar portions 221 are connected. Each bar portion 221 includes right and left end portions 221a connected to the right and left bar supporting portions 222, and an intermediate portion 221b connected to the end portions of the right and left end portions 221a opposite from the bar supporting sides thereof. The right and left end portions 221a extend in the direction along the side gates 212. The intermediate portion 221b extends in the lateral width direction of the load carrying deck 207. Between the intermediate portions 221b of the three bar portions 221, there are formed gaps S. The intermediate portions 211b of the three bar portions 221 are connected via a connecting member 223 at positions close to the end portions 221a. In this embodiment, each bar portion 221 is formed of a round pipe member. However, as a member for constituting the bar portion 221, an angular pipe member, a solid member, an angle member, etc. can be employed also.

[Arrangement of Supporting Portion 230]

As shown in FIG. 16, the right and left side gates 212 include supporting portions 230. The left bar supporting portion 222 of the deck extension member 220 is supported to the left supporting portion 230 and the right bar supporting portion 222 of the deck extension member 220 is supported to the right supporting portion 230, so that the deck extension member 220 is mounted between the pair of right and left supporting portions 230.

Figure 22:
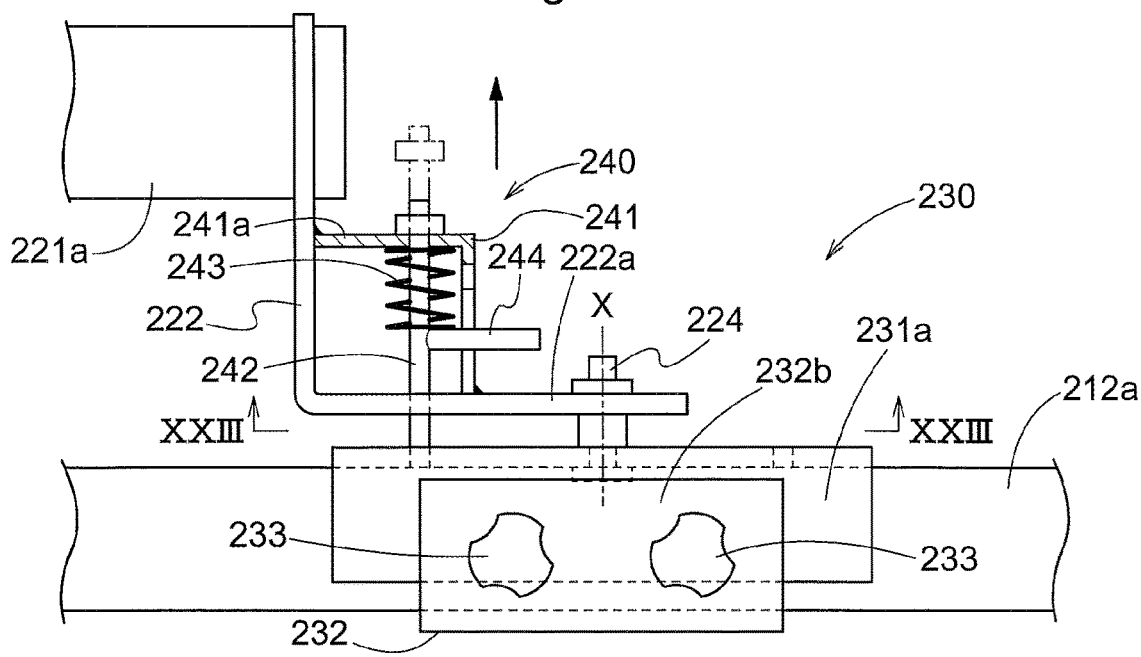
FIG. 22 is a plan view showing a right supporting portion.
Figure 23:
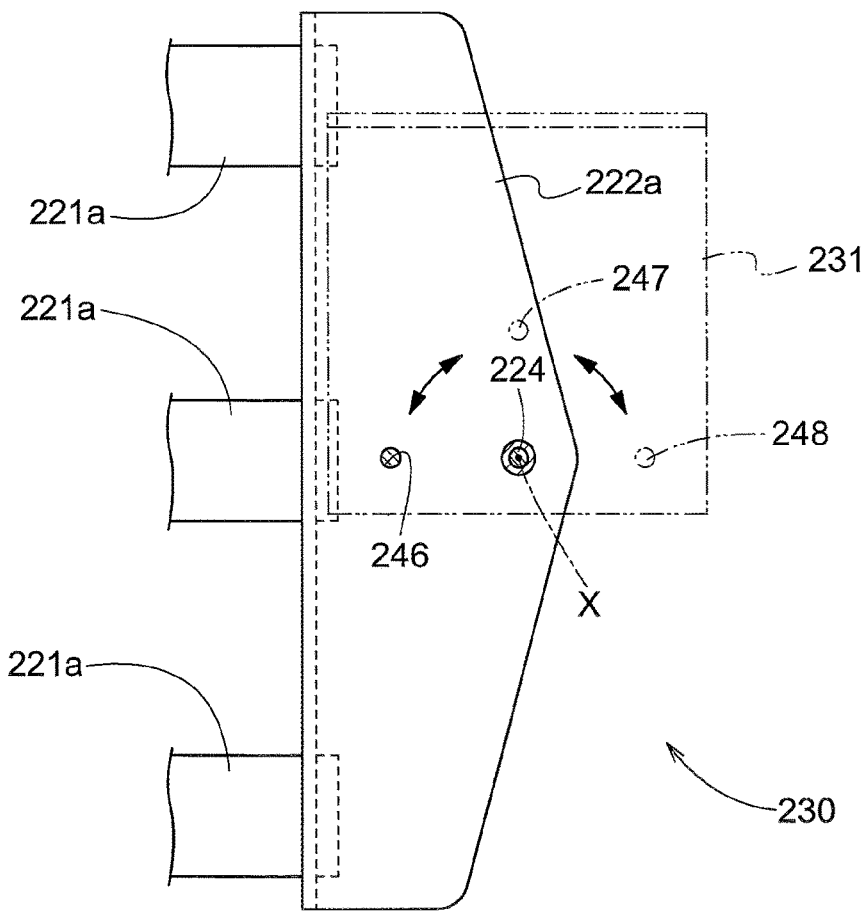
FIG. 23 is a section taken along XXIII-XXII in FIG. 22.

FIG. 22 is a plan view showing the right supporting portion 230. FIG. 23 is a section view taken along XXIII-XXIII in FIG. 22. FIG. 24 is a front view in section showing the right supporting portion 230. Illustration of the left supporting portion 230 is omitted as this has an arrangement identical to that of the right supporting portion 230.

As shown in FIG. 22, FIG. 23 and FIG. 24, the right/left supporting portion 230 (to be referred to simply as "supporting portion 230" hereinafter) includes a first attaching member 213, a second attaching member 232 and two connecting screws 233.

[Arrangement of Guide Rail Portion 212a]

As shown in FIG. 17 and FIG. 24, each side gate 212 includes a guide rail portion 212a extending in the front-rear direction of the load carrying deck 207. In the instant embodiment, the guide rail portion 212a is constituted of an upper edge portion of the side gate 212. As shown in FIG. 22 and FIG. 24, the first attaching member 231 is disposed on the inner side of the side gate 212. At an upper portion of the first attaching portion 213, there is provided an abutment portion 231a located on the upper side of the guide rail portion 212a.

As shown in FIG. 22 and FIG. 24, the second attaching portion 232 is disposed on the outer side of the side gate 212. At a lower portion of the second attaching member 232, there is provided an abutment portion 232a located on the lower side of the guide rail portion 212a. At an upper portion of the second attaching member 232, there is provided a screw supporting portion 232b disposed upwardly of the abutment portion 231a of the first attaching member 231.

The two connecting screws 233 are disposed side by side in the front-rear direction of the side gate 212 and are mounted to be rotatably operable between the screw supporting portion 232b of the second attaching member 232 and the abutment portion 231a of the first attaching member 231. A threaded portion 233a of each connecting screw 233 is engaged to a screw hole forming portion 234 of the abutment portion 231a. In each connecting screw 233, at a portion thereof located between the abutment portion 231a and the screw supporting portion 232b, there are provided a lock screw member 235 and a flange portion 236. The lock screw member 235, when fastened to the screw hole forming portion 234, fixes the connecting screw 233 at an adjusted position, thus preventing loosening of the connecting screw 233. The flange portion 236 is brought into abutment against the screw supporting portion 232b when the connecting screw 233 is rotatably operated to the fixing side, thereby to transmit the operational force of the connecting screw 233 to the second attaching member 232.

As the first attaching member 313 and the second attaching member 232 are interconnected via the connecting screw 233, the supporting portion 230 is attached to the side gate 212 with the guide rail portion 212a being clamped between the abutment portion 231a of the first attaching member 231 and the abutment portion 232a of the second attaching member 232.

As the two connecting screws 233 are rotatably operated to the fastening side, the abutment portion 231a is pushed down by the screw portion 233a and the screw supporting portion 232b is pushed up by the flange portion 236. With this, the abutment portion 231a is fastened to the upper portion of the guide rail portion 212a via a cushioning member 237 and the abutment portion 232a is fastened to the lower portion of the guide rail portion 212a via a cushioning member 238, whereby the first attaching member 231 and the second attaching member 232 firmly clamp the guide rail portion 212a. With this clamping force, the supporting portion 230 is fixed to the side gate 212.

When the two connecting screws 233 are rotatably operated to the fastening releasing side, the abutment portion 231a is pushed up by the screw portion 233a, thus loosening the fastening of the abutment portion 231a relative to the guide rail portion 212a and the push-up of the screw supporting portion 232b by the flange portion 236 is released, thus loosening the fastening of the abutment portion 232a relative to the guide rail portion 212a. With this, the clamping of the guide rail portion 212a by the first attaching member 231 and the second attaching member 232 is loosened, thus allowing sliding of the first attaching member 231 and the second attaching member 232 relative to the side gate 212, so that the supporting portion 230 is guided by the guide rail portion 212a, thus allowing sliding adjustment of the load carrying deck 207 in the front-rear direction.

As shown in FIG. 22, FIG. 23 and FIG. 24, a connecting portion 222a is provided at one end in the deck lateral width direction in the bar supporting portion 222 of the deck extension member 220. The connecting portion 222a is supported to the first attaching member 213 via a connecting shaft 224 and the deck extension member 220 is supported to the supporting portion 230 via the connecting shaft 224. The deck extension member 220 is pivotally operable relative to the supporting portion 230, with a connection axis X of the connecting shaft 224 extending in the deck lateral width direction acting as a pivot.

[Switching Operation of Deck Extension Member 220]

As shown in FIG. 15 and FIG. 16, the tailgate 213 is switched to the lowered opened posture. When the right and left supporting portions 230 are rendered slidable by rotatably operating the two connecting screws 233 of the right and left supporting portions 230 to the fixing releasing side, the right and left supporting portions 230, along the guide rail portions 212a, are slidably adjusted to portions of the side gate 212 near their rear ends. After completion of the sliding adjustment, by rotatably operating the two connecting screws 233 of the right and left supporting portions 230 to the fixing side, thus fixing the right and left supporting portions 230 at adjusted positions. After the right and left supporting portions 230 can be fixed, the deck extension member 220 will be pivotally operated to the deck rear side relative to the right and left supporting portions 230, thus being protruded upwardly of the tailgate 213. With this, the deck extension member 220 is set under a deck extending state. In this case, by rendering the right and left lock mechanisms 240 (see FIG. 22) active, the deck extension member 220 can be fixed under the deck extending state by these lock mechanisms 240.

When the deck extension member 220 assumes the deck extending state, the tailgate 231 has its floor portion 210 extended rearwards, and also the opposed lateral sides and the rear side of the tailgate 230 are surrounded by the deck extension member 220, so that a load carrying space thereof is extended rearwards by the tailgate 213 and the deck extension member 220 and the load carrying capacity of the load carrying deck 207 between the floor portion 210 and the tailgate 213 is increased.

Figure 19:
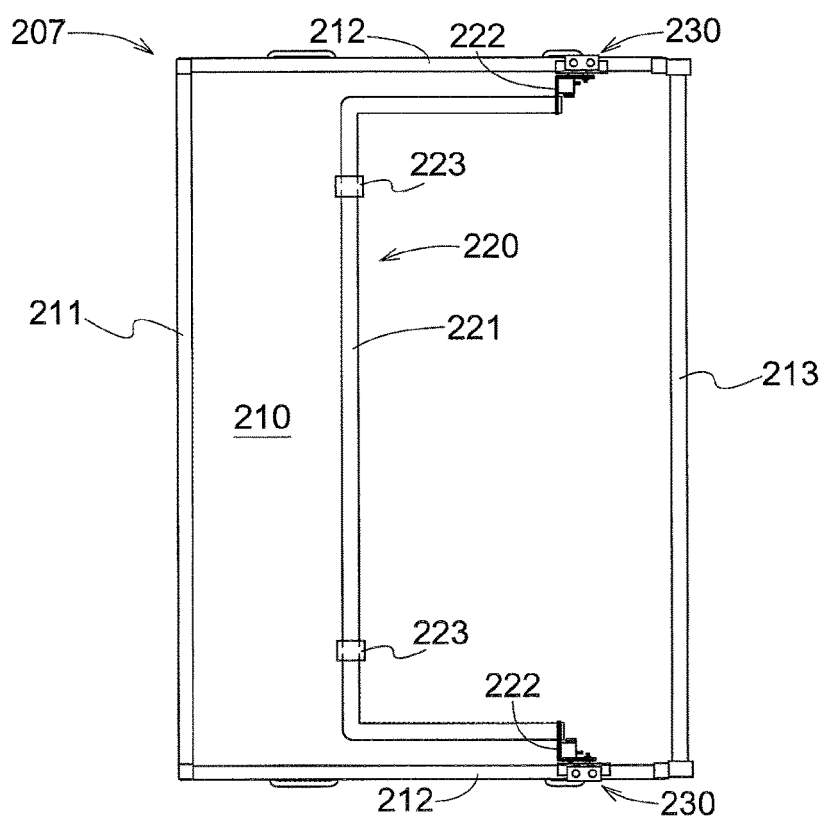
FIG. 19 is a plan view showing the deck with the deck extension member being stored to a first storage state.
Figure 20:
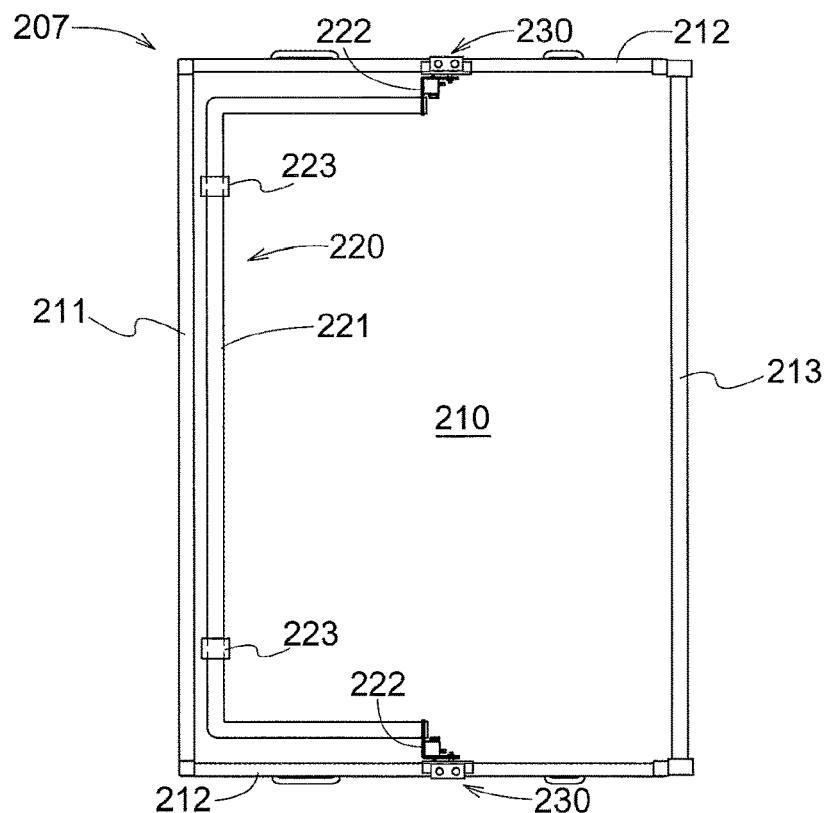
FIG. 20 is a plan view showing the deck with the deck extension member being stored to the first storage state.
Figure 21:
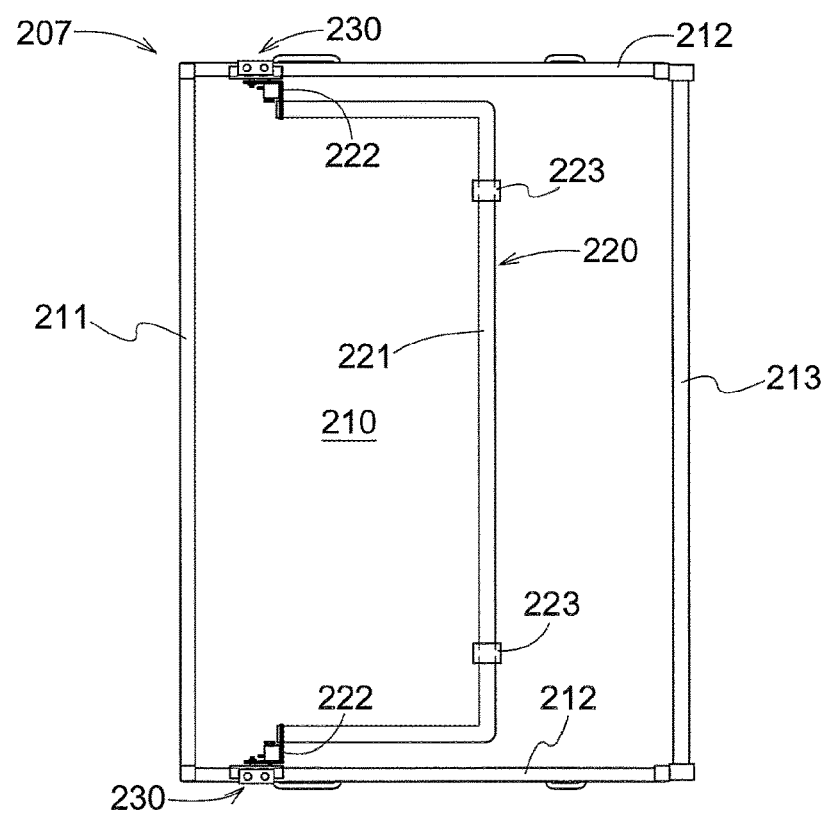
FIG. 21 is a plan view showing the deck with the deck extension member being stored to the first storage state.

As shown in FIG. 19, under the state in which the right and left supporting portions 230 are fixed to the side gates 212 as being kept at the adjusted positions for rendering the deck extension member 220 under its deck extending state, the deck extension member 220 is pivotally operated to the deck front side relative to the right and left supporting portions 230, thus being collapsed upwardly of the floor portion 210. Or, as shown in FIG. 20, the right and left supporting portions 230 are slidably adjusted to and fixed at positions on more deck front side than the adjusted positions thereof in the case of the deck extension member 220 being under the deck extending state, and under this state, the deck extension member 220 can be pivotally operated to the deck front side relative to the right and left supporting portions 230 thus being collapsed upwardly of the floor portion 210. Further alternatively, as shown in FIG. 21, the right and left supporting portions 230 are slidably adjusted to and fixed at positions on more deck front side than the adjusted positions thereof in the case of the deck extension member 220 being under the deck extending state, and under this state, the deck extension member 220 can be pivotally operated to the deck rear side relative to the right and left supporting portions 230 thus being collapsed upwardly of the floor portion 210. In either case, the deck extension member 220 is set under a first storage state, so that by retracting the deck extension member 220 to the inner side of the deck 207, the deck extension member 220 can be stored under a posture along the floor portion 210. In either case, by rendering the right and left lock mechanisms 240 active, the deck extension member 220 can be fixed under the first storage state.

As shown in FIG. 19, FIG. 20 and FIG. 21, by changing the fixing position of the right and left supporting portions 230, the supporting position of the deck 207 to the deck extension member 220 can be changed in the front-rear direction of the load carrying deck 207, and the storage position of the deck extension member 220 under the first storage state can be changed in the front-rear direction of the load carrying deck 207.

As shown in FIG. 17 and FIG. 18, the deck extension member 220 is pivotally elevated relative to the right and left supporting portions 230 to be raised relative to the floor portion 210. Then, the deck extension member 220 is set under a second storage state, so that the deck extension member 220 can be stored under a storage state in which the deck extension member 220 is retracted to the inner side of the deck 207 and the leading end side of this deck extension member 220 projects upwards from the side gate 212. In this case too, by rendering the right and left lock mechanisms 240 active, the deck extension member 220 can be fixed under the second storage state.

As shown in FIGS. 17 and 18, in case the deck extension member 220 is stored under the second storage state, the intermediate portions 221b of the three bar portions 221 are disposed side by side in the front-rear direction of the load carrying deck 207, so that by inserting an elongate object into the gap S between the intermediate portions 221b from above, a portion of this elongate object positioned more upward than the floor portion 210 will be supported by the intermediate portions 221b of the bar portions 221, so that elongate object will be placed erect on the floor portion 210. Thus, the elongate object can be loaded under its erect state.

[Arrangement of Lock Mechanisms 240]

As shown in FIG. 22 and FIG. 24, each lock mechanism 240 includes a spring case 241, a lock pin 242 and a lock spring 243.

The spring case 241 is fixed to the bar supporting portion 222. The lock ping 242 is slidably supported to a case wall portion 241a of the spring case 241 and the connecting portion 222a. The lock pin 242 includes an operational arm 244. A leading end side of the operational arm 244 projects to the outside of the spring case 241 through a guide hole 245 formed in the spring case 241. The lock spring 243 is fitted on the lock pin 242, with the spring 243 being clamped between the operational arm 244 and the case wall portion 241a. The lock pin 242 has its leading end side slidably urged by the lock spring 243 toward the first attaching member 213.

The lock mechanism 240 is rendered into a first lock state when the leading end side of the lock pin 242 is inserted by the lock spring 243 into a first pin hole 246 of the first attaching member 231 (see FIG. 23), thus fixing the deck extension member 220 under the deck extending state. The lock mechanism 240 is rendered into the first lock state also when the deck extension member 220 assumes the first storage state in which it is pivoted to the deck rear side relative to the supporting portions 230, thus fixing the deck extension member 220 under the first storage state.

The lock mechanism 240 is rendered into a second lock state when leading end side of the lock pin 242 is inserted by the lock spring 243 into a second pin hole 247 of the first attaching member 231 (see FIG. 23), thus fixing the deck extension member 220 under the second storage state.

The lock mechanism 240 is rendered into a third lock state when leading end side of the lock pin 242 is inserted by the lock spring 243 into a third pin hole 248 of the first attaching member 231 (see FIG. 23), thus fixing the deck extension member 220 under the first storage state in which it is pivoted to the deck front side relative to the supporting portions 230.

Referring further to the lock mechanism 240, when the operational arm 244 is slidably operated against the lock spring 243 to the end in the guide hole 245 opposite from the first attaching member 231, the leading end side of the lock pin 242 is withdrawn from the first pin hole 246, the second pin hole 247 and the third pin hole 248, thus being rendered into a lock releasing state. By retaining the operational arm 244 to a retaining portion 245a communicated to the guide hole 245 (see FIG. 24), the lock mechanism 240 can be maintained under the lock releasing state.

[Modified Embodiments of Third Embodiment]

(1) In the foregoing embodiment, there was disclosed the arrangement in which the deck extension member 220 can be stored under the first storage state and the second storage state. Alternatively, it is also possible to arrange such that the deck extension member 220 can be stored under only one of the first storage state and the second storage state.

(2) In the foregoing embodiment, there was disclosed the arrangement in which the deck extension member 220 is constituted of three (3) bar portions 221. Instead, it may be constituted of fewer than two (2) bar portions 221 or more than four (4) bar portions 221. Further alternatively, it may be constituted of a bar portion and a plate member in combination, or of a plate member alone.

(3) In the foregoing embodiment, there was disclosed the arrangement in which the connecting screw 233 interconnecting the first attaching member 231 and the second attaching member 232 is utilized as the fixing means. Alternatively, it is also possible to arrange to employ a connecting screw for connection only and a connecting screw for fixing only. Further alternatively, it is also possible to employ an arrangement that requires no connecting screw at all and to employ a connecting screw for fixing only.

(4) In the foregoing embodiment, there was disclosed the arrangement in which a utility vehicle was employed as a vehicle having a load carrying deck. However, the vehicle having a load carrying deck is not limited thereto, but may be various kinds of vehicles having a load carrying deck, such as a pickup truck, a transport vehicle, etc.

What is claimed is:

1. A multi-purpose vehicle comprising:
   a vehicle body frame;
   front wheels supported at a front portion of the vehicle body frame;
   rear wheels supported at a rear portion of the vehicle body;
   a seat provided between the front wheels and the rear wheels;
   a load carrying deck provided on a rear side of the seat;
   a right tail lamp provided on a right lower side of a rear portion of the load carrying deck;
   a left tail lamp provided on a left lower side of the rear portion of the load carrying deck;
   a right tail lamp guard provided on a rear side of the right tail lamp and connected to the load carrying deck;
   a left tail lamp guard provided on the rear side of the left tail lamp and connected to the load carrying deck; and
   a rear bumper connected to and between the right tail lamp guard and the left tail lamp guard.

2. The multi-purpose vehicle of claim 1, wherein the rear bumper is connected to and between a lower area of the right tail lamp guard and a lower area of the left tail lamp guard.

3. The multi-purpose vehicle of claim 1, wherein:
   a right end portion of the rear bumper projects more on right outer side than a right end portion of the right tail lamp guard; and
   a left end portion of the rear bumper projects more on left outer side than a left end portion of the left tail lamp guard.

4. The multi-purpose vehicle of claim 1, wherein:
   the load carrying deck is supported to be pivotable about a right-left axis extending at a rear portion of the load carrying deck;
   the right tail lamp is attached to a right lower portion of the rear portion of the load carrying deck; and
   the left tail lamp is attached to a left lower portion of the rear portion of the load carrying deck.

5. The multi-purpose vehicle of claim 1, wherein:
   a right pivot member is connected to a lower portion of a rear right portion of the load carrying deck;
   a left pivot member is connected to a lower portion of a rear left portion of the load carrying deck;
   the load carrying deck includes a tailgate at a rear portion thereof;
   the tailgate is supported to be openable/closable by the right pivot member and the left pivot member;
   the right tail lamp guard is connected to the right pivot member; and
   the left tail lamp guard is connected to the left pivot member.

6. An attachment device for a vehicle having a load carrying deck, the attachment device being for use in attaching an attaching object to a gate of the load carrying deck, the attachment device comprising:
   a mounting portion formed at a portion of the gate, the mounting portion being placed over an upper edge portion of the gate, the mounting portion being slidably adjustable in a longitudinal direction of the gate, with the upper edge portion acting as a guide rail and being fixable by fastening to the upper edge portion at an adjusted position;
   an attaching portion formed at a portion of the attaching object; and
   a retaining device for detachably retaining the attaching object to the attaching portion, the retaining device being replaceable according an attaching object.

7. The attachment device of claim 6, wherein:
the mounting portion includes two separate mounting portions divided between inner and outer sides of the load carrying deck;
a connecting bolt is provided for interconnecting the two separate mounting portions; and
as the two separate mounting portions are fastened to the upper edge portion by the connecting bolt, the mounting portion is fixed and fastened to the gate.

8. The attachment device of claim 6, wherein the attaching portion comprises a screw hole.

9. A vehicle having a load carrying deck, the load carrying deck having right and left side gates, and a tailgate pivotable between an elevated closed posture and a lowered opened posture, the vehicle comprising:
a deck extension member switchable between a deck extending state in which the extension member protrudes above the tailgate to extend a deck space, and a storage state in which the extension member is retracted to the inner side of the load carrying deck and stored above a floor portion of the deck; and
a pair of right and left supporting portions that are supported by the right and left side gates to be individually slidably adjustable in the front-rear direction and fixable at adjusted positions;
wherein the deck extension member is supported to be pivotable between the deck extending state and the storage state about a connection axis of the pair of right and left supporting portions as a pivot axis, the connection axis extending in a lateral width direction of the load carrying deck.

10. The vehicle having a load carrying deck of claim 9, wherein as the storage state, there are set a first storage state in which the deck extension member is collapsed above the floor portion, and a second storage state in which the deck extension member is raised relative to the floor portion.

11. The vehicle having a load carrying deck of claim 10, wherein:
the deck extension member includes a plurality of bar portions supported by and attached to the pair of right and left supporting portions, the bar portions having right-left intermediate portions thereof extending in the lateral width direction of the deck, gaps being formed between respective adjacent intermediate portions; and
when the deck extension member is set to the second storage state, the intermediate portions of the plurality of bar portions are disposed side by side in the front-rear direction of the deck.

12. The vehicle having a load carrying deck of claim 9, wherein:
the side gate includes a guide rail portion that extends in the front-rear direction of the load carrying deck; and
the supporting portion includes: a first attaching member to be slidably attached to an upper portion of the guide rail portion; a second attaching member to be slidably attached to a lower portion of the guide rail portion; and a connecting screw for connecting the first attaching member with the second attaching member; and
wherein the connecting screw is rotatably supported by the first attaching member and the second attaching member; and
wherein the connecting screw is operable between a fastening state in which the first attaching member and the second attaching member are fastened to the guide rail portion for clamping the guide rail portion by the first attaching member and the second attaching member, thereby to fix the supporting portion to the side gate; and a fastening released state in which fastening of the first attaching member and the second attaching member to the guide rail portion is released, thus allowing sliding of the first attaching member and the second attaching member, thereby to allow sliding of the supporting portion relative to the side gate.

* * * * *

UNITED STATES PATENT AND TRADEMARK OFFICE
CERTIFICATE OF CORRECTION

PATENT NO. : 10,618,572 B2  
APPLICATION NO. : 15/973934  
DATED : April 14, 2020  
INVENTOR(S) : Satoko Ueno et al.

Page 1 of 1

It is certified that error appears in the above-identified patent and that said Letters Patent is hereby corrected as shown below:

In the Claims

Column 18, Line 67, Claim 6, after "according" insert -- to --

Signed and Sealed this  
Twenty-second Day of September, 2020

Andrei Iancu  
*Director of the United States Patent and Trademark Office*